US011596911B2

(12) United States Patent
Pierce et al.

(10) Patent No.: US 11,596,911 B2
(45) Date of Patent: Mar. 7, 2023

(54) CHEMICAL INJECTION SYSTEM FOR CONNECTION TO A CHEMICAL TANK AND A PROCESS LINE

(71) Applicant: MPW INDUSTRIAL SERVICES GROUP, INC., Hebron, OH (US)

(72) Inventors: Justin James Pierce, Granville, OH (US); Neil Andrew Dewitt, Granville, OH (US); Garrett J. Petty, Columbus, OH (US)

(73) Assignee: MPW INDUSTRIAL SERVICES GROUP, INC., Hebron, OH (US)

( * ) Notice: Subject to any disclaimer, the term of this patent is extended or adjusted under 35 U.S.C. 154(b) by 429 days.

(21) Appl. No.: 16/841,867

(22) Filed: Apr. 7, 2020

(65) Prior Publication Data

US 2021/0308639 A1    Oct. 7, 2021

(51) Int. Cl.
| | |
|---|---|
| *B01F 25/313* | (2022.01) |
| *F04D 13/00* | (2006.01) |
| *B01F 35/60* | (2022.01) |
| *F16L 39/00* | (2006.01) |
| *F16L 33/18* | (2006.01) |
| *F16L 11/20* | (2006.01) |
| *B01F 35/30* | (2022.01) |
| *B01F 101/00* | (2022.01) |

(52) U.S. Cl.
CPC .... *B01F 25/3133* (2022.01); *B01F 25/31331* (2022.01); *B01F 35/60* (2022.01); *F04D 13/00* (2013.01); *B01F 2035/351* (2022.01); *B01F 2101/2204* (2022.01); *F16L 11/20* (2013.01); *F16L 33/18* (2013.01); *F16L 39/005* (2013.01); *F16L 2201/20* (2013.01)

(58) Field of Classification Search
CPC ............... B01F 25/3133; B01F 35/60; B01F 2035/351; B01F 2101/2204; B01F 35/602; B01F 35/7176; B01F 25/31331; B01F 25/313; F04D 13/00; F16L 11/20; F16L 33/18; F16L 39/005; F16L 2201/20; F04B 23/028
USPC .................................................. 366/167.1
See application file for complete search history.

(56) References Cited

U.S. PATENT DOCUMENTS

| | | | | |
|---|---|---|---|---|
| 3,032,358 A | * | 5/1962 | Rolston ................... | F16L 33/18 285/251 |
| 7,137,569 B1 | * | 11/2006 | Miller ................... | B01F 25/313 239/599 |
| D935,486 S | * | 11/2021 | Pierce .............................. | D15/7 |

(Continued)

FOREIGN PATENT DOCUMENTS

FR    3061490    *  7/2018
WO  WO-2010039683 A2  *  4/2010  .......... B01F 3/04056

*Primary Examiner* — Charles Cooley
(74) *Attorney, Agent, or Firm* — Tucker Ellis LLP; Patrick Clunk

(57) ABSTRACT

Provided is a chemical injection system for connection to a chemical tank and a process line. The system includes a pump box configured to attach to the tank, the pump box including a body defining an interior, a pump assembly disposed within the interior of the body of the pump box, and an injection assembly configured to be fluidly coupled to the pump box. The injection assembly includes an injection lance having a flange and a stem, a first seal abutting a first side of the flange of the injection lance, and a second seal abutting a second side of the flange of the injection lance.

20 Claims, 30 Drawing Sheets

(56) References Cited

U.S. PATENT DOCUMENTS

| | | | | |
|---|---|---|---|---|
| D943,059 S | * | 2/2022 | Pierce | D23/213 |
| 11,420,165 B2 | * | 8/2022 | Myrick | B01F 25/23 |
| 2009/0174087 A1 | * | 7/2009 | Bauer | F22G 5/123 |
| | | | | 261/66 |
| 2013/0233421 A1 | * | 9/2013 | Furet | F04B 9/105 |
| | | | | 137/565.11 |
| 2014/0116556 A1 | * | 5/2014 | Critsinelis | F16L 9/19 |
| | | | | 138/97 |
| 2016/0325244 A1 | * | 11/2016 | Lambinet | F04B 13/02 |
| 2020/0179823 A1 | * | 6/2020 | Bailey | C10G 33/04 |
| 2021/0308639 A1 | * | 10/2021 | Pierce | B01F 35/602 |

* cited by examiner

CHEMICAL INJECTION SYSTEM FOR CONNECTION TO A CHEMICAL TANK AND A PROCESS LINE

TECHNICAL FIELD

In general, the present invention relates to a chemical injection system, and in particular to a double containment chemical injection system.

BACKGROUND OF THE INVENTION

Chemical injection systems can be provided to inject a chemical, such as sodium hypochlorite, sulfuric acid, hydrochloric acid, etc. into a process stream under pressure. The systems can include a pump connected to a source of the chemical to pump the chemical through a conduit, such as PVC piping, and to the process stream.

SUMMARY OF THE INVENTION

In accordance with an embodiment of the present invention, a chemical injection system for connection to a chemical tank and a process line is provided. The chemical injection system includes a pump box configured to attach to the tank, the pump box including a body defining an interior, a pump assembly disposed within the interior of the body of the pump box, and an injection assembly configured to be fluidly coupled to the pump box. The injection assembly includes an injection lance having a flange with first and second sides, a stem extending from the first side of the flange and configured to be received in the process line, a passage extending through the flange and stem, and one or more outlet ports in the stem extending perpendicular to and into the passage, the passage having an inlet at the second side of the flange for receiving a chemical, a first seal abutting the first side of the flange of the injection lance and configured to abut a flange of a process line, and a second seal abutting the second side of the flange of the injection lance.

In accordance with another embodiment of the present invention, a lance assembly is provided that includes an injection lance having a flange with first and second sides, a stem extending from the first side of the flange, a passage extending through the flange and stem, and one or more outlet ports in the stem extending perpendicular to and into the passage, the passage having an inlet at the second side of the flange and a closed inner end, a first seal abutting the first side of the flange of the injection lance and configured to abut a flange of a process line, a second seal abutting the second side of the flange of the injection lance, a connection flange having a first side abutting the second seal and a second side, and a hose barb connected to the connection flange at the second side.

In accordance with another embodiment of the present invention, a chemical injection system for connection to a chemical tank and a process line is provided. The chemical injection system includes a pump box configured to attach to the tank, the pump box including a body defining an interior, a pump assembly disposed within the interior of the body of the pump box, and an injection assembly configured to be fluidly coupled to the pump box, the injection assembly including an injection lance having a flange with first and second sides, a stem extending from the first side of the flange and configured to be received in the process line, a passage extending through the flange and stem, and one or more outlet ports in the stem extending perpendicular to and into the passage, the passage having an inlet at the second side of the flange for receiving a chemical, a first seal abutting the first side of the flange of the injection lance and configured to abut a flange of a process line, a second seal abutting the second side of the flange of the injection lance, a connection flange having a first side abutting the second seal and a second side, a hose barb connected to the connection flange at the second side, and one or more double containment conduits connected between the pump box and the injection lance, the one or more double containment conduits having an inner conduit fluidly connected to the injection lance for delivering the chemical from the pump assembly to the injection lance, and an outer conduit surrounding the inner conduit and being connected to the hose barb.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
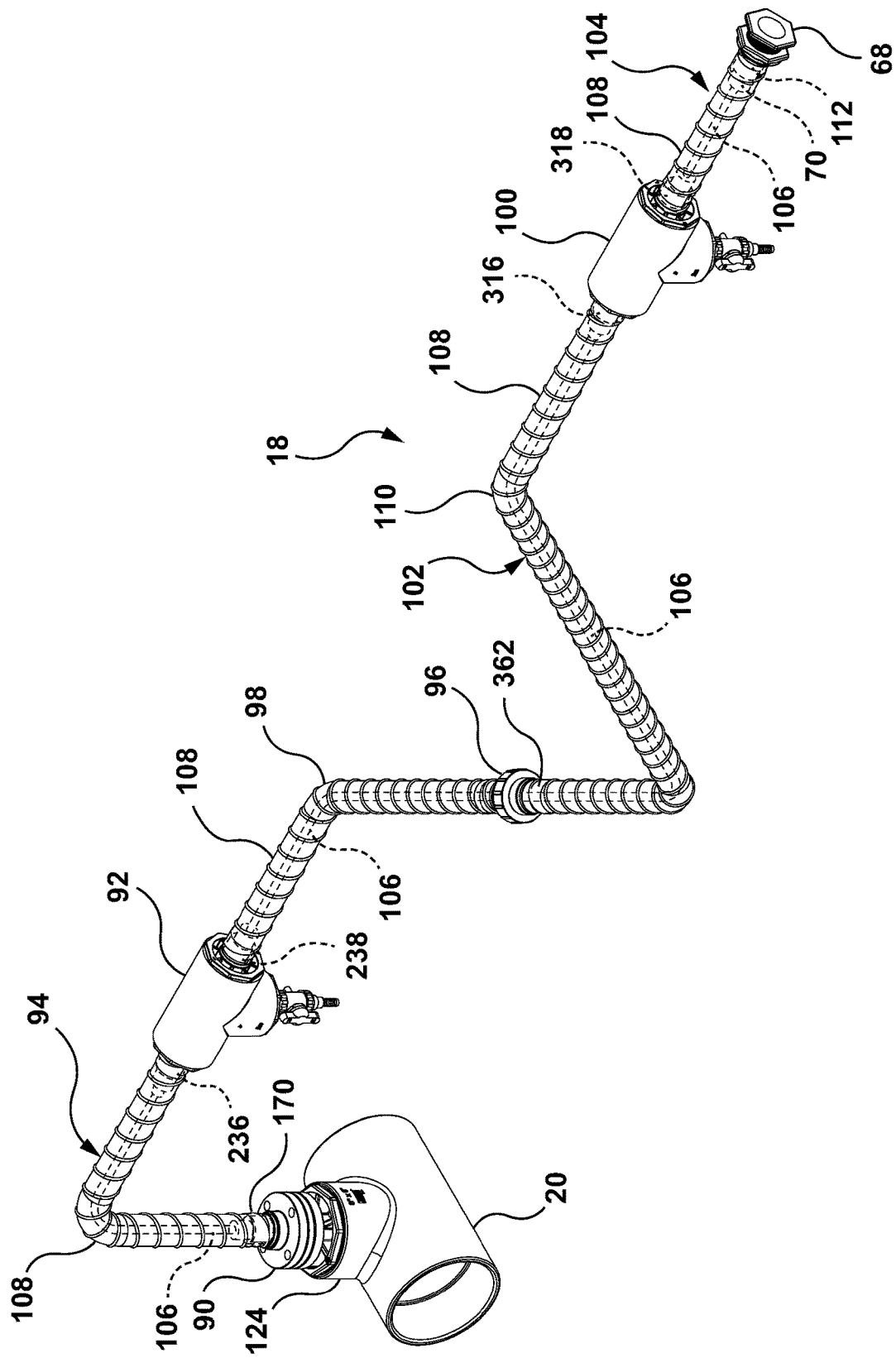
FIG. 1 is a perspective view of an exemplary injection assembly of a chemical injection system.
Figure 2:
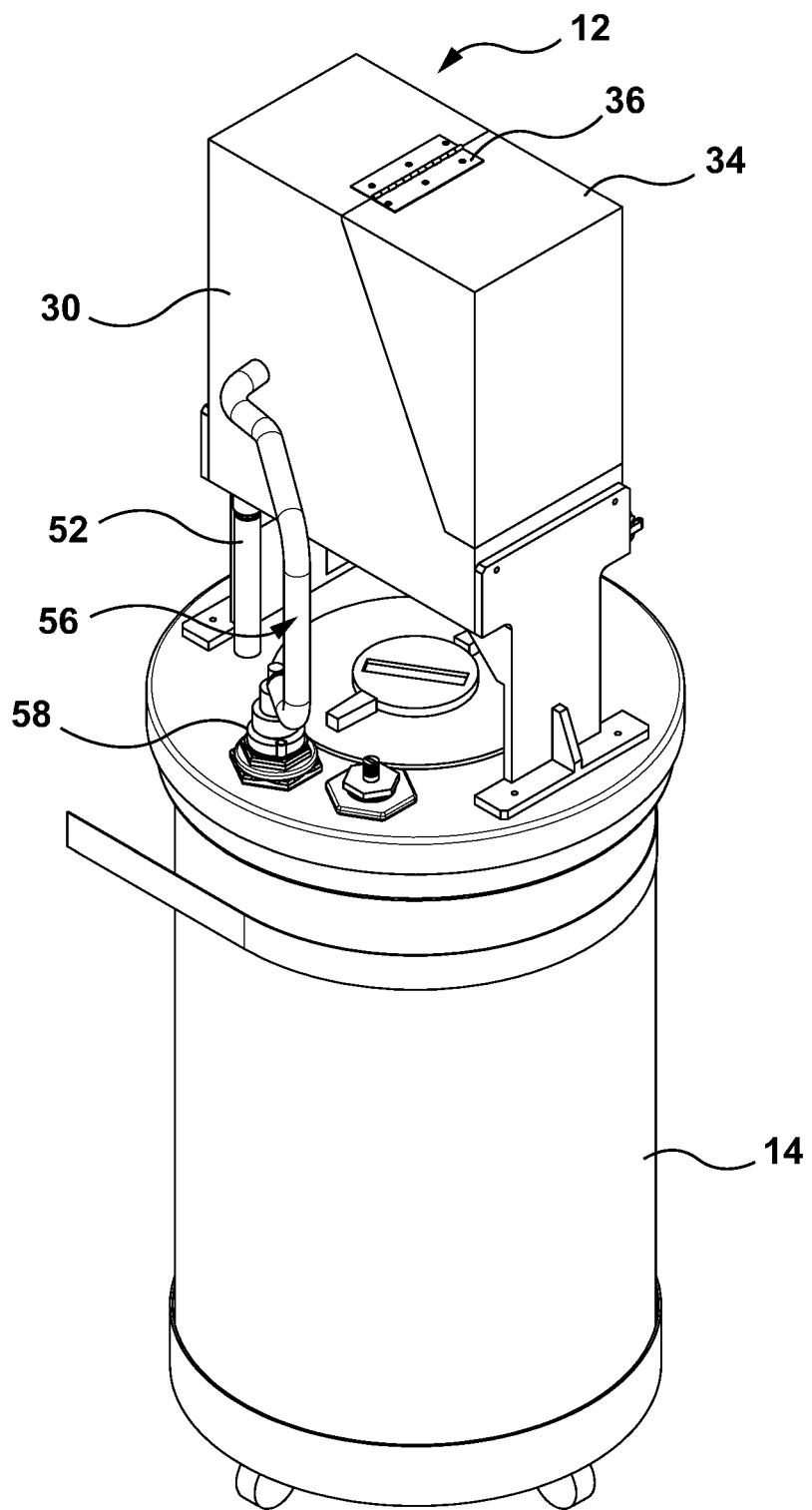
FIG. 2 is a perspective view of an exemplary pump box and tank of the chemical injection system.
Figure 3:
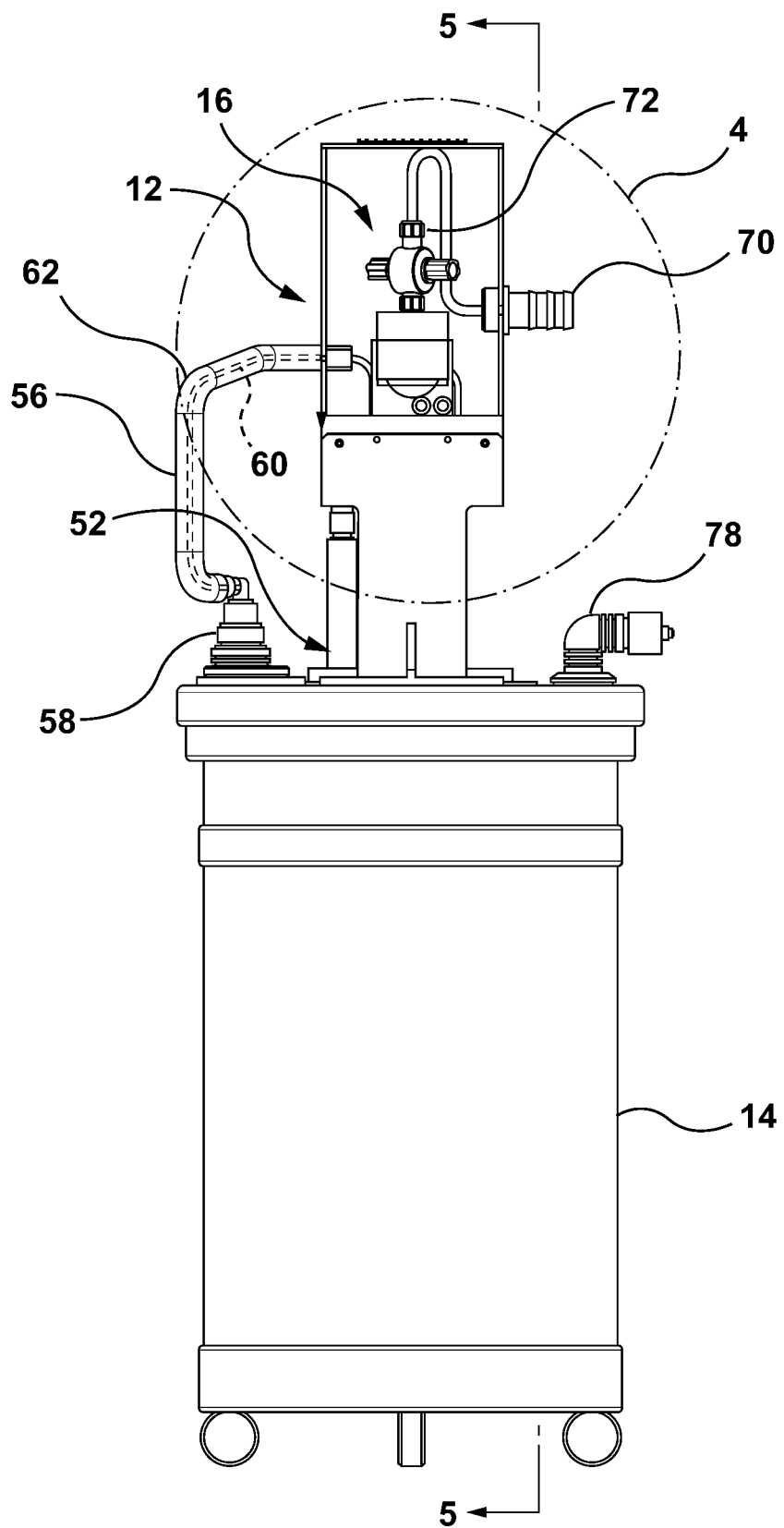
FIG. 3 is a front view of the pump box and tank.
Figure 4:
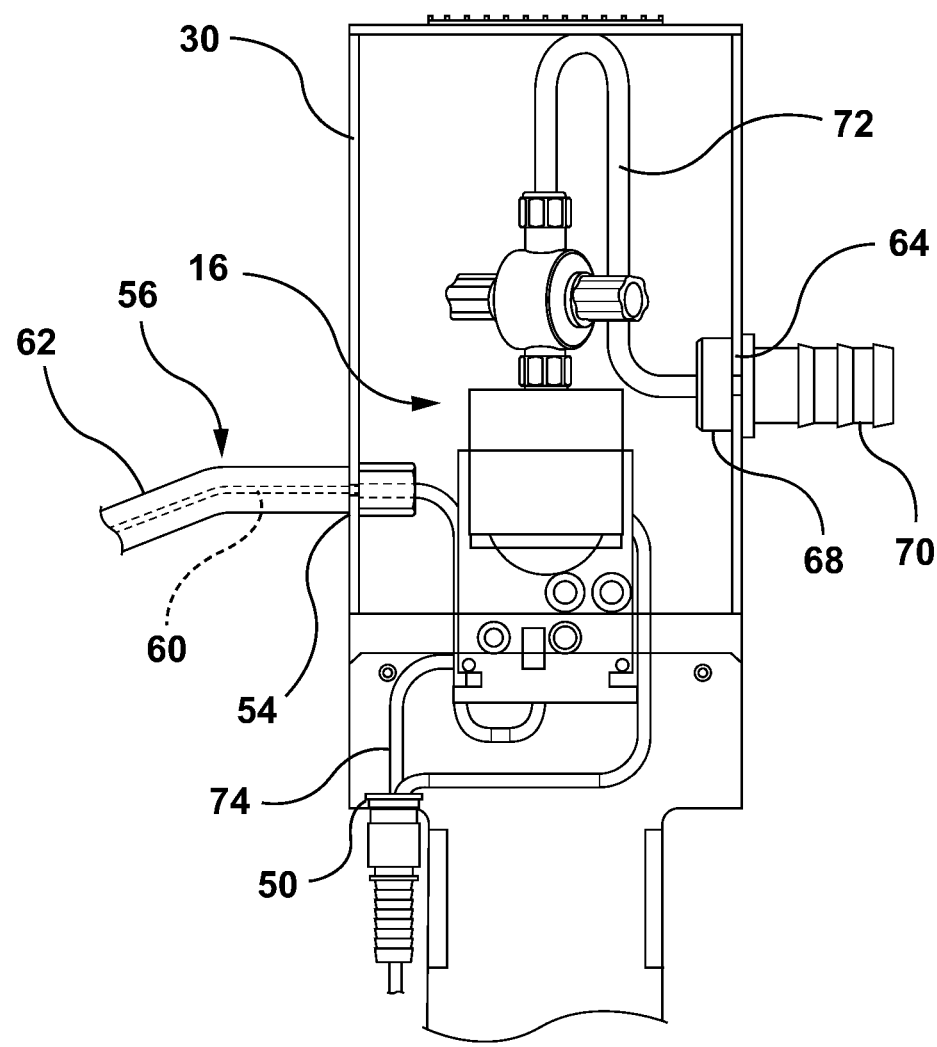
FIG. 4 is an enlarged view of detail 4 in FIG. 3.
Figure 5:
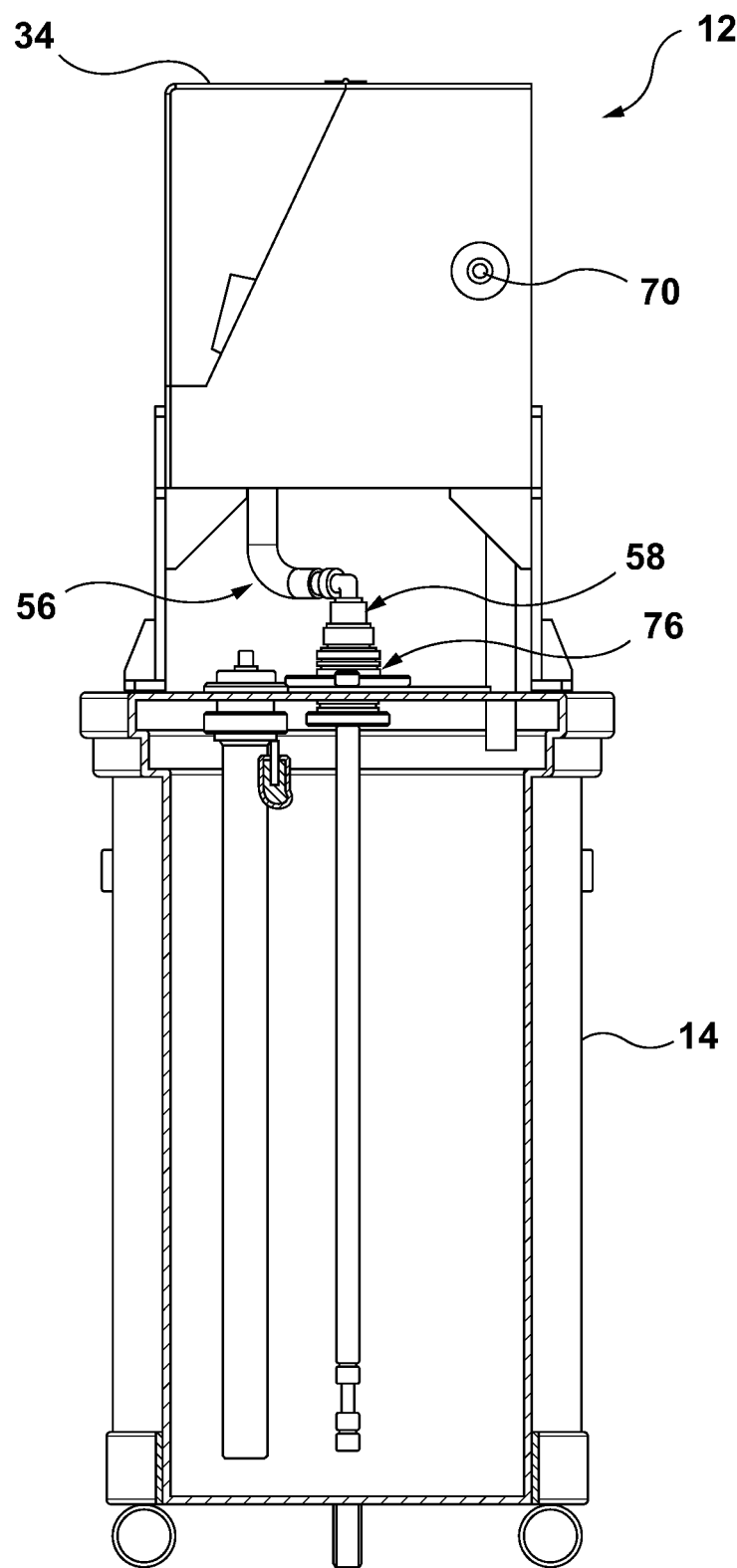
FIG. 5 is a cross-sectional view taken about line 5-5 in FIG. 3.

Embodiments of the invention relate to methods and systems that relate to a chemical injection system for connection to a chemical tank and a process line, the chemical injection system including a pump box configured to attach to the tank, a pump assembly disposed within the pump box, and an injection assembly configured to be fluidly coupled to the pump box. The injection assembly includes an injection lance having a flange and a stem, a first seal abutting a first side of the flange of the injection lance, and a second seal abutting a second side of the flange of the injection lance.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Turning now to FIGS. 1-5, an exemplary double containment chemical injection system is illustrated. The chemical injection system includes a pump box 12 attached to a tank 14 containing a chemical, a pump assembly 16 disposed within the pump box 12, and an injection assembly 18 configured to be coupled to the pump box 12 to deliver the chemical from the tank 14 to a process line 20, a portion of which is shown. The double containment system provides a secondary manner of containing potential chemical leaks during online dosing processes thereby providing a safety and environmental protection system. The chemical may be a corrosive or hazardous chemical being injected into the process line 20, which may contain water for example. The chemical may include, sodium hypochlorite 12%, sulfuric acid 50%, hydrochloric acid 37%, citric acid 50%, sodium hydroxide 50%, aluminum sulfate, ferric chloride, ferric sulfate, sodium bisulfite 38%, antiscalant, hydrogen peroxide, etc.

Figure 6:
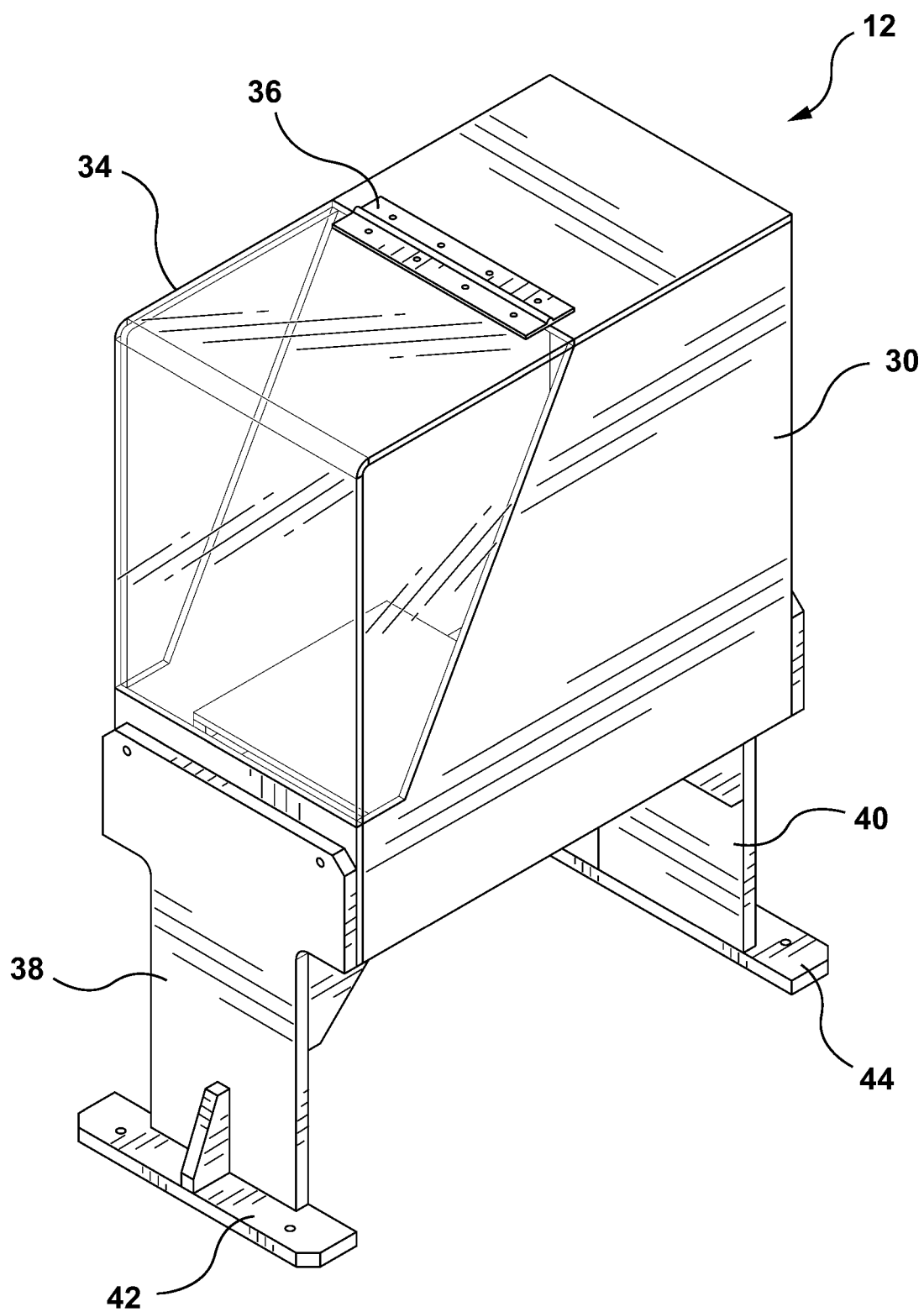
FIG. 6 is a perspective view of the pump box.
Figure 7:
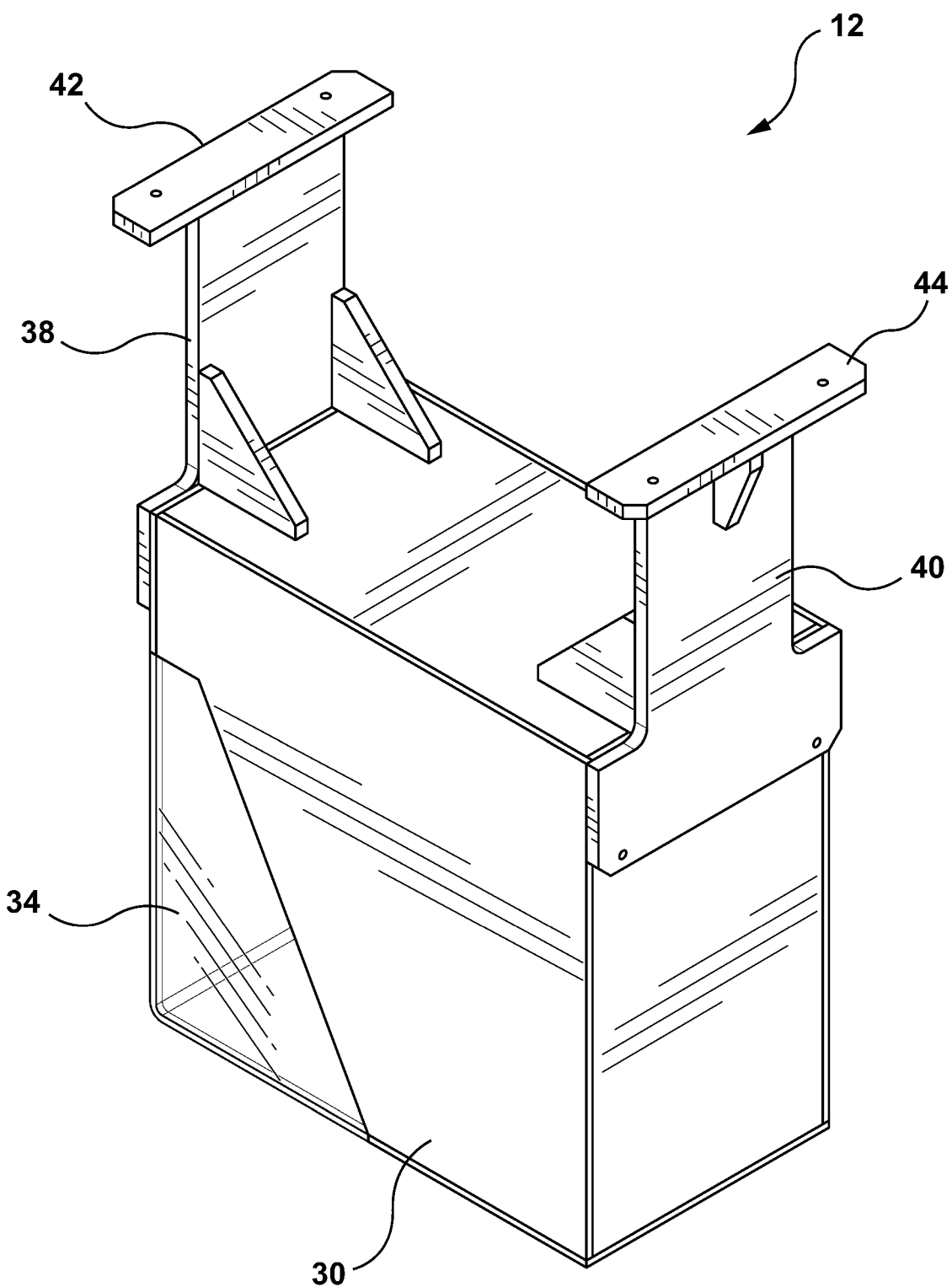
FIG. 7 is another perspective view of the pump box.
Figure 8:
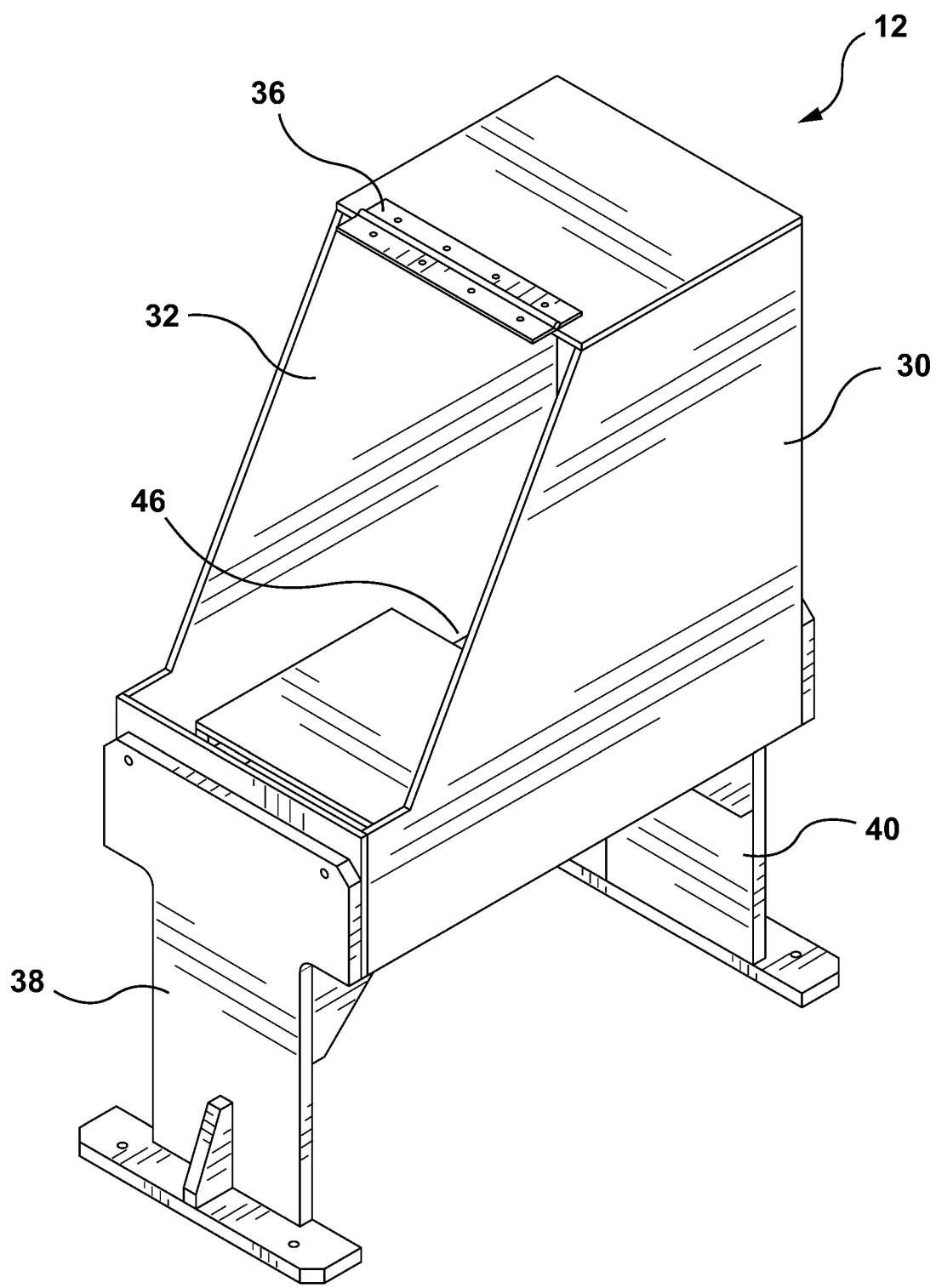
FIG. 8 is still another perspective view of the pump box with an access door removed.

Referring additionally to FIGS. 6-8, the pump box 12 includes body 30 defining an interior 32 for receiving the pump assembly 16, an access door 34 pivotally coupled to the body 30 by a hinge 36, and first and second legs 38 and 40 coupled to the body 30 and having feet 42 and 44 respectively that are coupled to the tank 14. The access door 34 may be transparent to allow an operator to view the interior 32 of the pump box 12. For example, the access door 34 may be made of a polymer, such as a polycarbonate. The first and second legs 38 and 40 and the feet 42 and 44 are coupled to the body 30 and the tank 14 respectively in any suitable manner, such as fasteners. The interior 32 of the body 30 includes a well 46 at the bottom of the body 30 for fluid to gather if there is a leak inside the pump box 12.

The pump box 12 can include several ports for receiving conduits to connect the pump box to the tank 14 and the injection assembly 18, and the ports may be drilled during manufacture or may be drilled onsite. For example, the pump box 12 includes a drain port 50 at a bottom of the body 30 that connects to a drain conduit 52 to drain fluid in the well 46 back into the tank 14 and through which one or more conduits 74 extend to deliver fluid from the pump assembly 16 to the tank 14. The pump box 12 also includes a suction port 54, for example on a side of the body 30, through which a double containment suction conduit 56 extends and that is connected to a suction lance 58 in the tank 14 connected to a flange 76 that draws the chemical from the tank 14 and delivers it to the pump assembly 16. The suction conduit 56 includes an inner conduit 60 through which the chemical flows from the suction lance 58 to the pump assembly 16 and an outer conduit 62 that surrounds the inner conduit 60 to contain any leakage in the suction conduit and deliver it back to the tank 14. The inner conduit 60 and outer conduit 62 may extend from the suction lance 58, through the suction port 54 and to the pump assembly 16, or alternatively couple to one or more conduits connected to the suction lance 58 and/or pump assembly 16. The pump box 12 also includes a discharge port 64, for example on a side of the body 30, that connects to a connector 68 having a hose barb 70 that connects to a conduit 72 connected to the pump assembly 16 and a conduit of the injection assembly 18 as discussed below. The tank 14 can additionally include a connection 78 for connecting to a source of fluid to fill the tank 14. It will be appreciated that in an embodiment the pump box may be provided at a location away from the tank or positioned on the tank without being connected thereto.

Turning now to FIGS. 1 and 9-22, the injection assembly 18 will be discussed in detail. The injection assembly 18 includes a lance assembly 90, a ball valve assembly 92 connected to the lance assembly 90 by a first double containment conduit 94, a union 96 connected to the ball valve assembly 92 by a second double containment conduit 98, a check valve assembly 100 connected to the union 96 by a third double containment conduit 102, and a fourth double containment conduit 104 connected to the hose barb 70 of the connector 68. It will be appreciated that depending on the length of the chemical injection system, additional ball valve assemblies, unions, check valve assemblies, double containment conduits may be used, and the lengths of the double containment conduits may be varied. They system provides for the double containment of the chemical throughout the entire system.

The first, second, third, and fourth double containment conduits 94, 98, 102, and 104 each include an inner conduit 106 or tube through which the chemical flows and an outer conduit 108 or hose that surrounds the respective inner conduit 106 to contain any leakage from the inner conduit 106. The inner and outer conduits 106 and 108 may be flexible, allowing for easy installation and repairs. The inner conduit 106 may be made of a suitable material, such as polyethylene, such as a linear low-density polyethylene, and the outer conduit 108 may be made of a suitable material, such as flexible polyvinyl chloride (PVC) having PVC spirals 110 for rigidity. The outer conduit 108 is shown as being transparent to allow an operator to view the inside of the conduit 108 to quickly determine if there are any leaks. If there is a leak within one of the double containment conduits 94, 98, 102, or 104, the respective outer conduit 108 can be disconnected and pulled back from the component it is attached to allowing access to the respective inner conduit 106 without having to disassemble the system. As shown in FIG. 1, the inner conduit 106 of the fourth double containment conduit 104 is connected to a suitable connector in the hose barb 70 or otherwise extends into the pump box 12, and a suitable connector, such as spiral double bolt clamp 112 is attached to the hose barb 70 with the outer conduit 108 of the fourth double containment conduit 104 sandwiched therebetween. Leakage in the system can drain through the outer conduit 108, through the hose barb 70 and back into the pump box 12.

Figure 9:
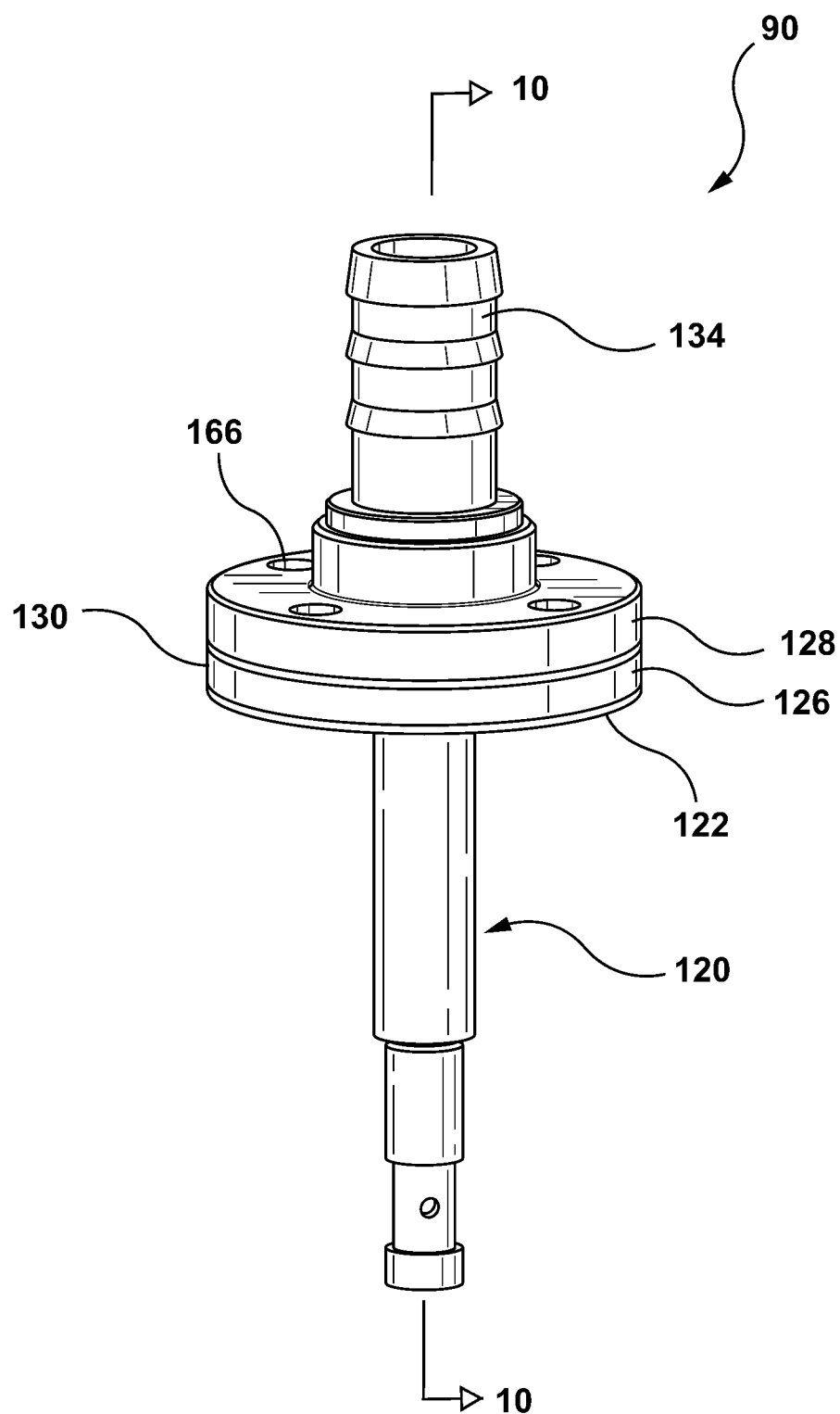
FIG. 9 is a perspective view of a lance assembly.
Figure 10:
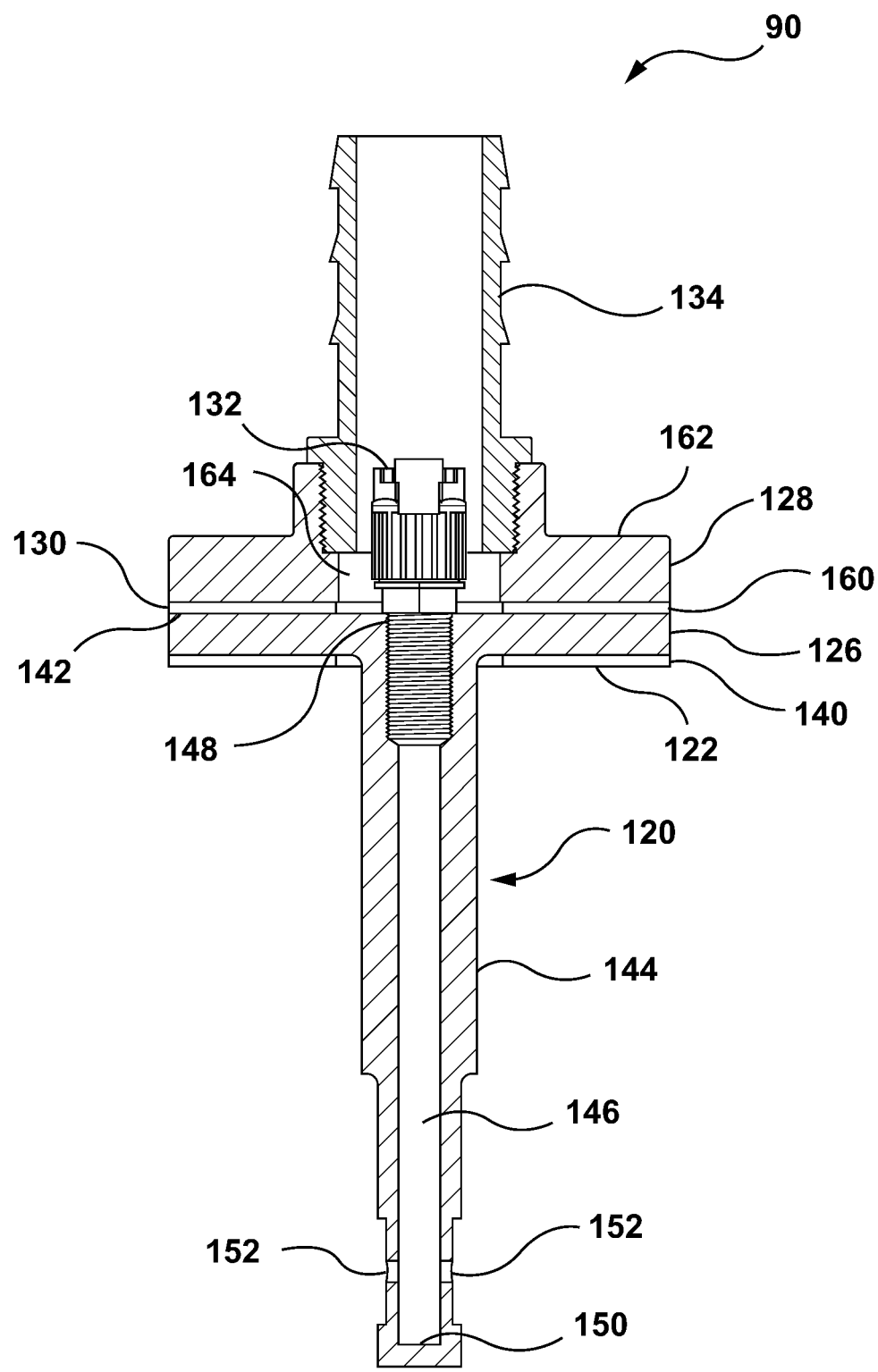
FIG. 10 is a cross-sectional view taken about line 10-10 in FIG. 9.
Figure 11:
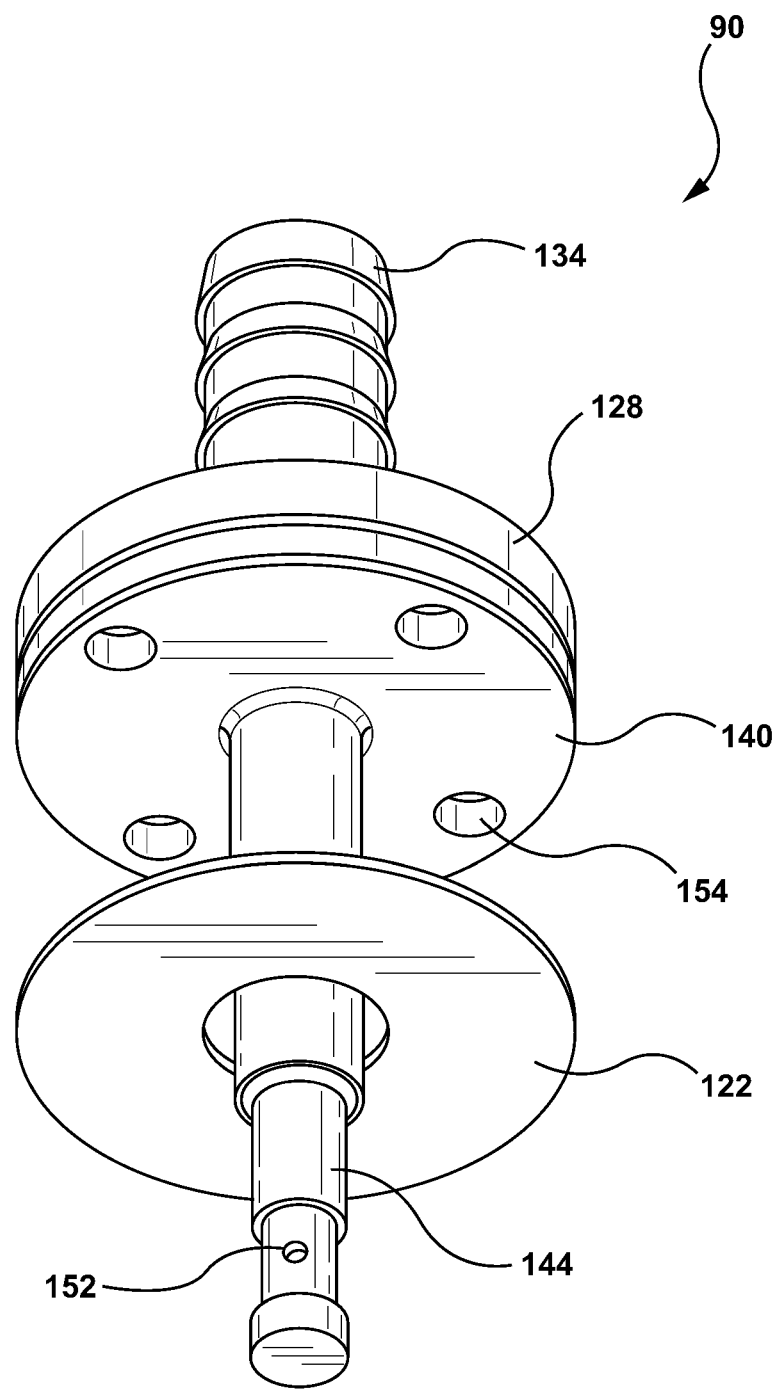
FIG. 11 is another perspective view of the lance assembly.
Figure 12:
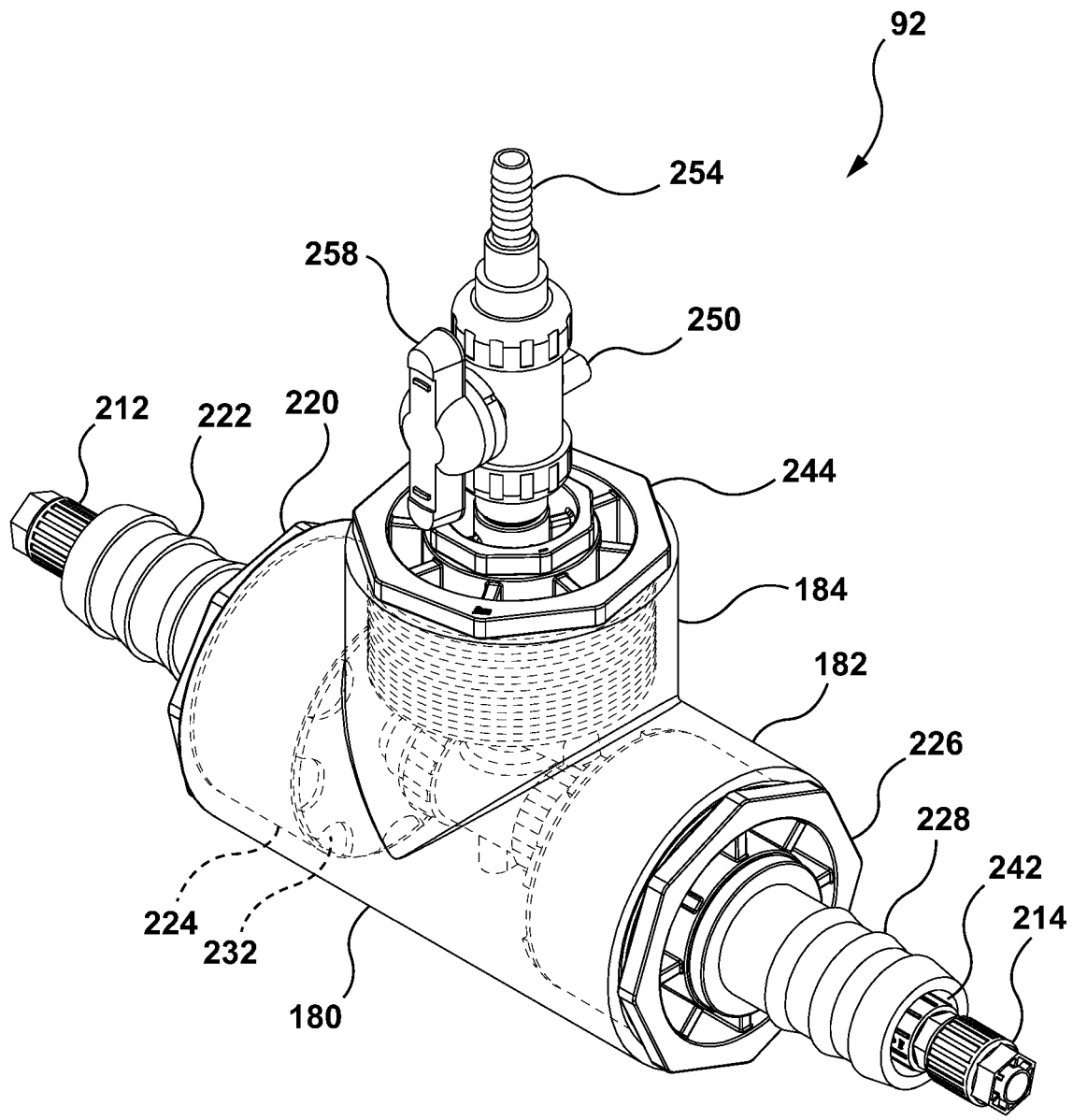
FIG. 12 is a perspective view of a ball valve assembly.
Figure 13:
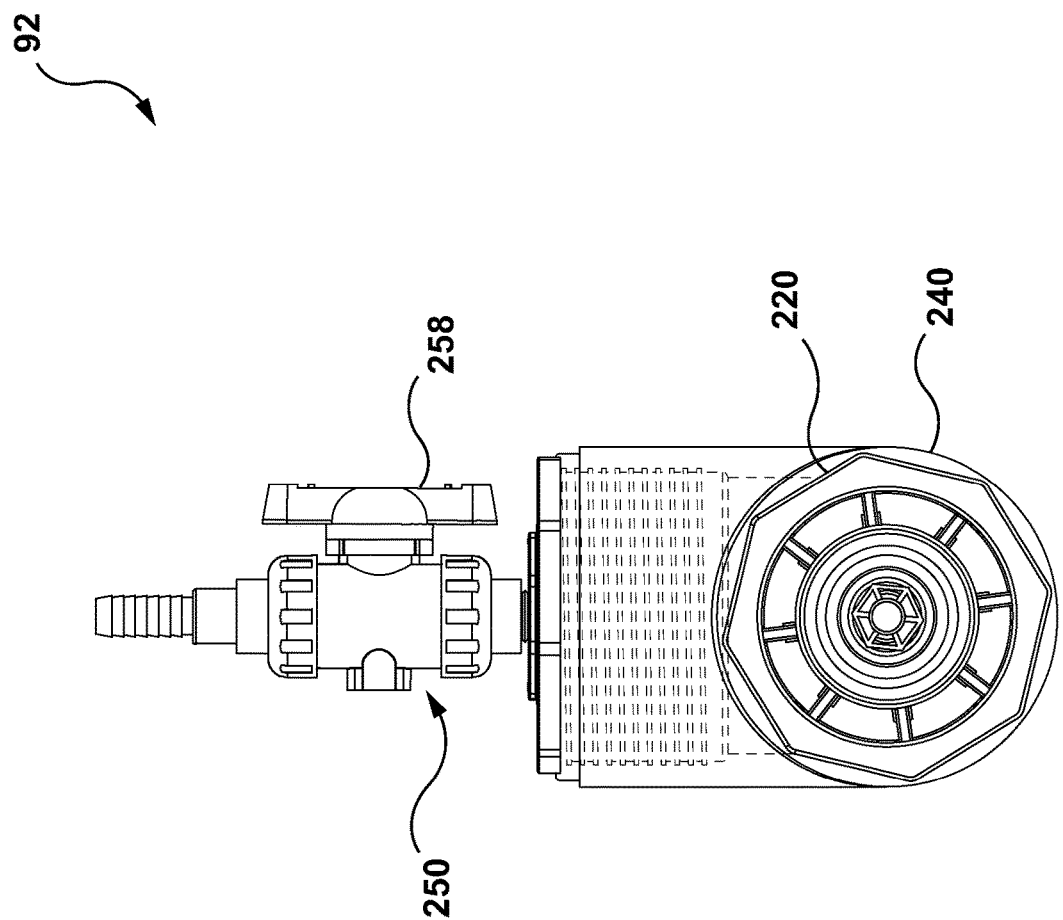
FIG. 13 is an end view of the ball valve assembly.
Figure 14:
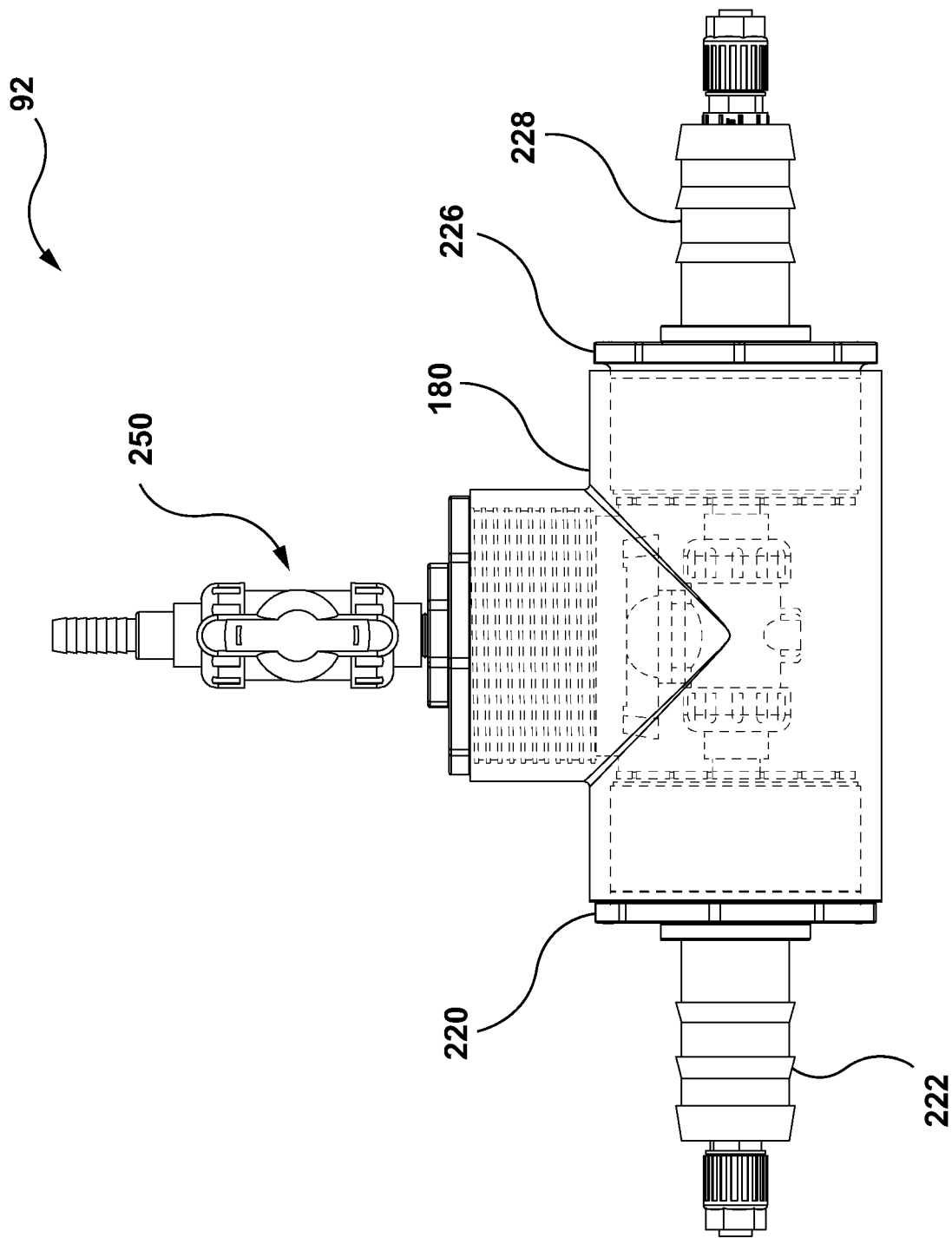
FIG. 14 is a front view of the ball valve assembly.
Figure 15:
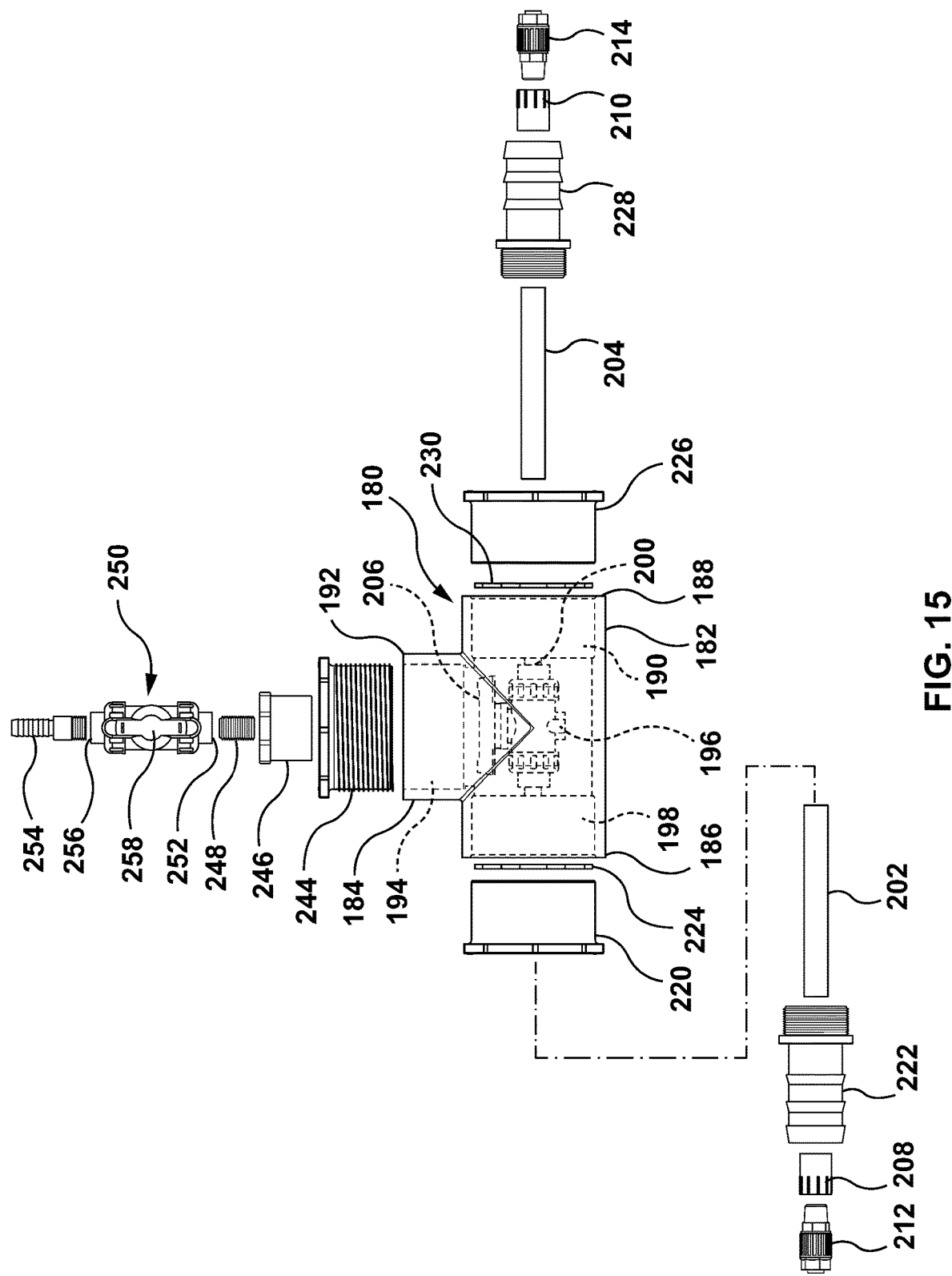
FIG. 15 is an exploded view of the ball valve assembly.
Figure 16:
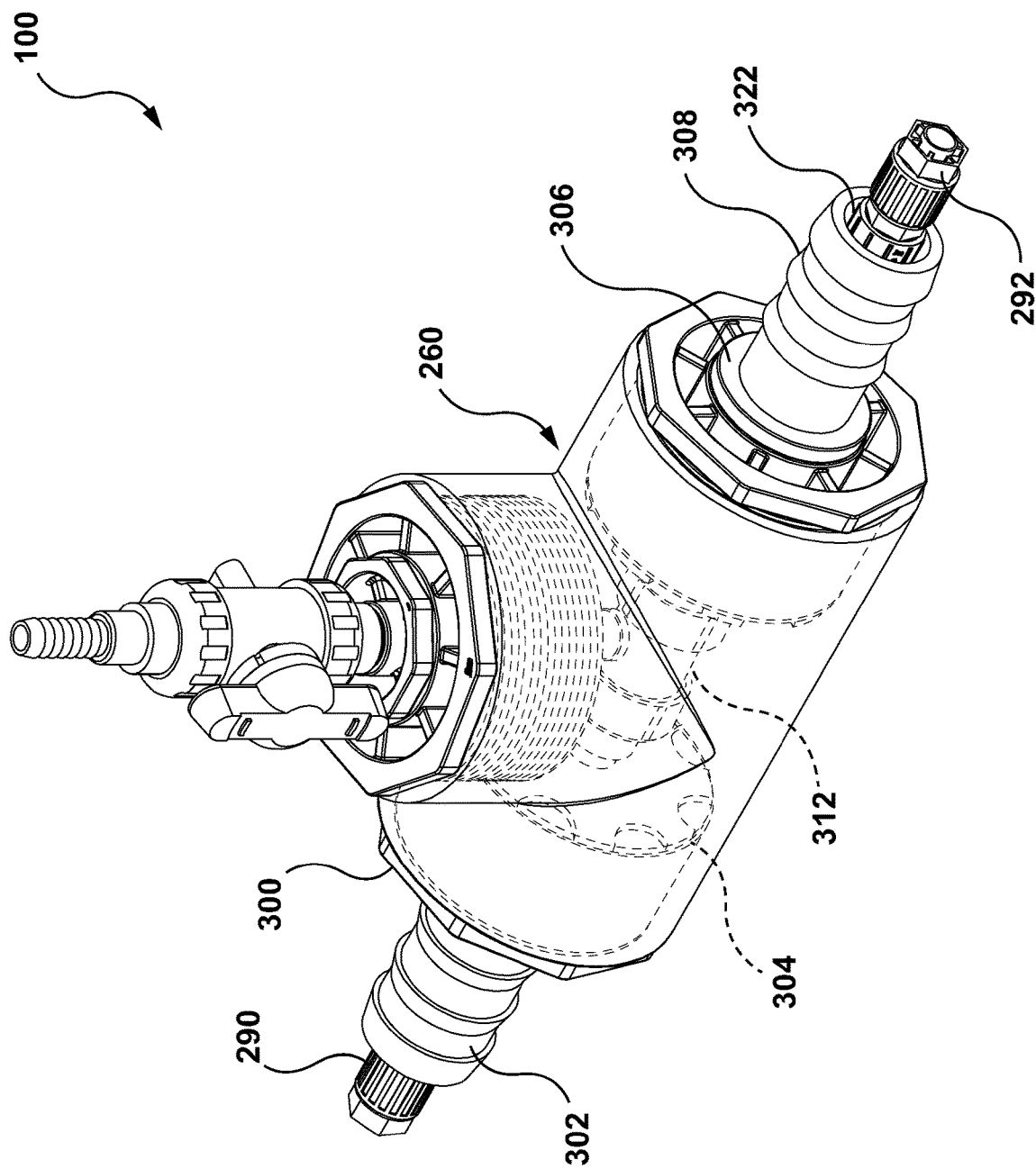
FIG. 16 is a perspective view of a check valve assembly.
Figure 17:
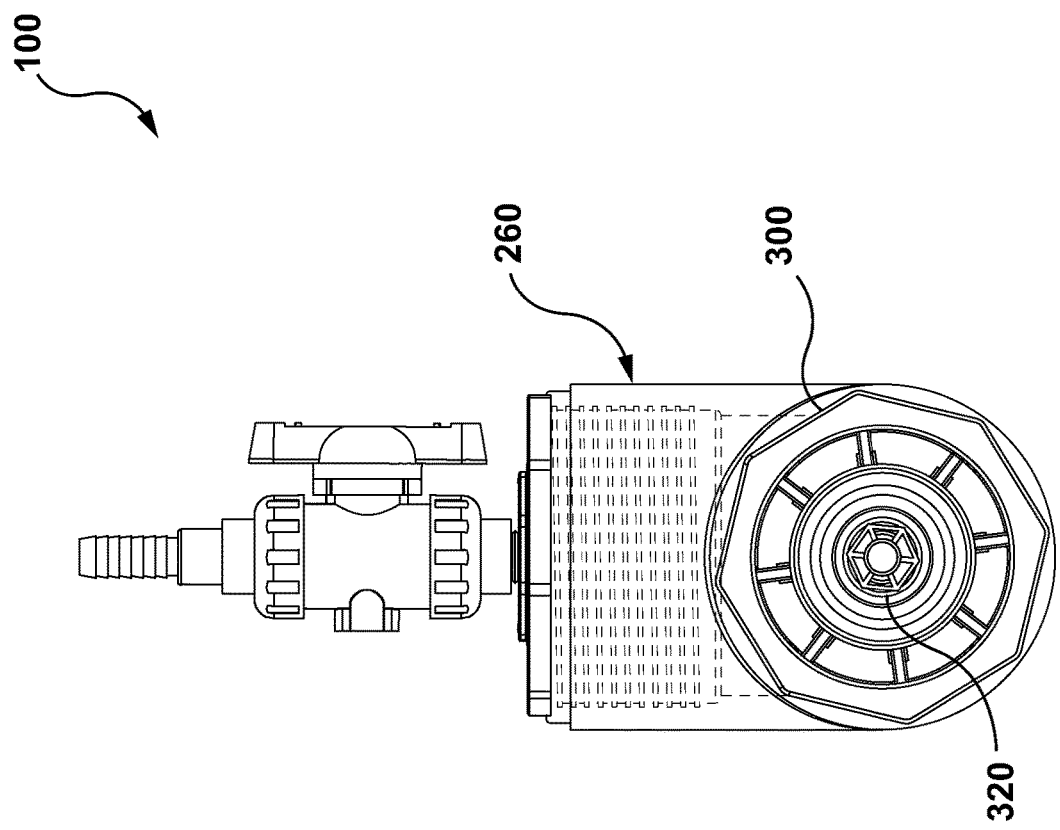
FIG. 17 is an end view of the check valve assembly.
Figure 18:
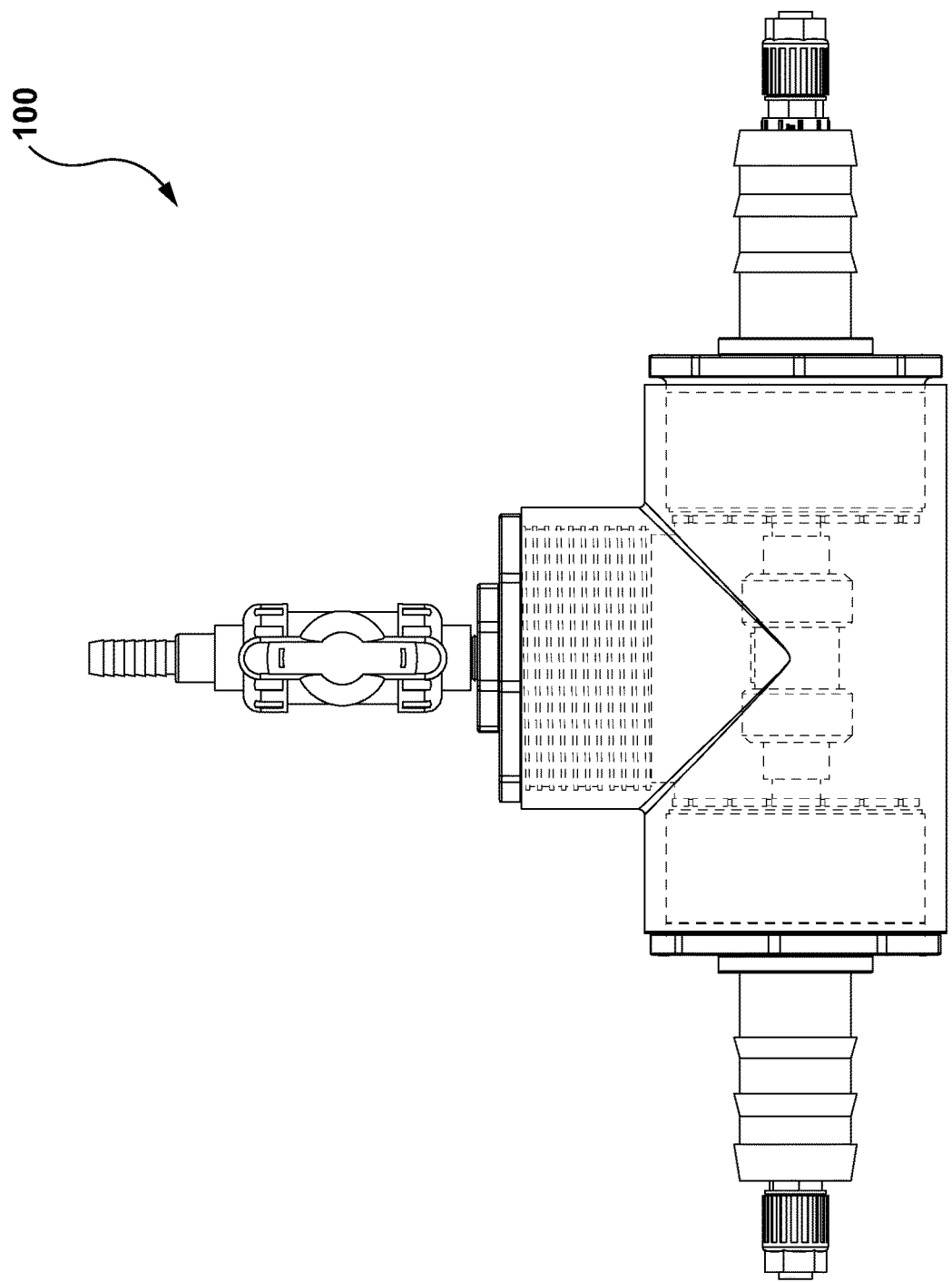
FIG. 18 is a front view of the check valve assembly.
Figure 19:
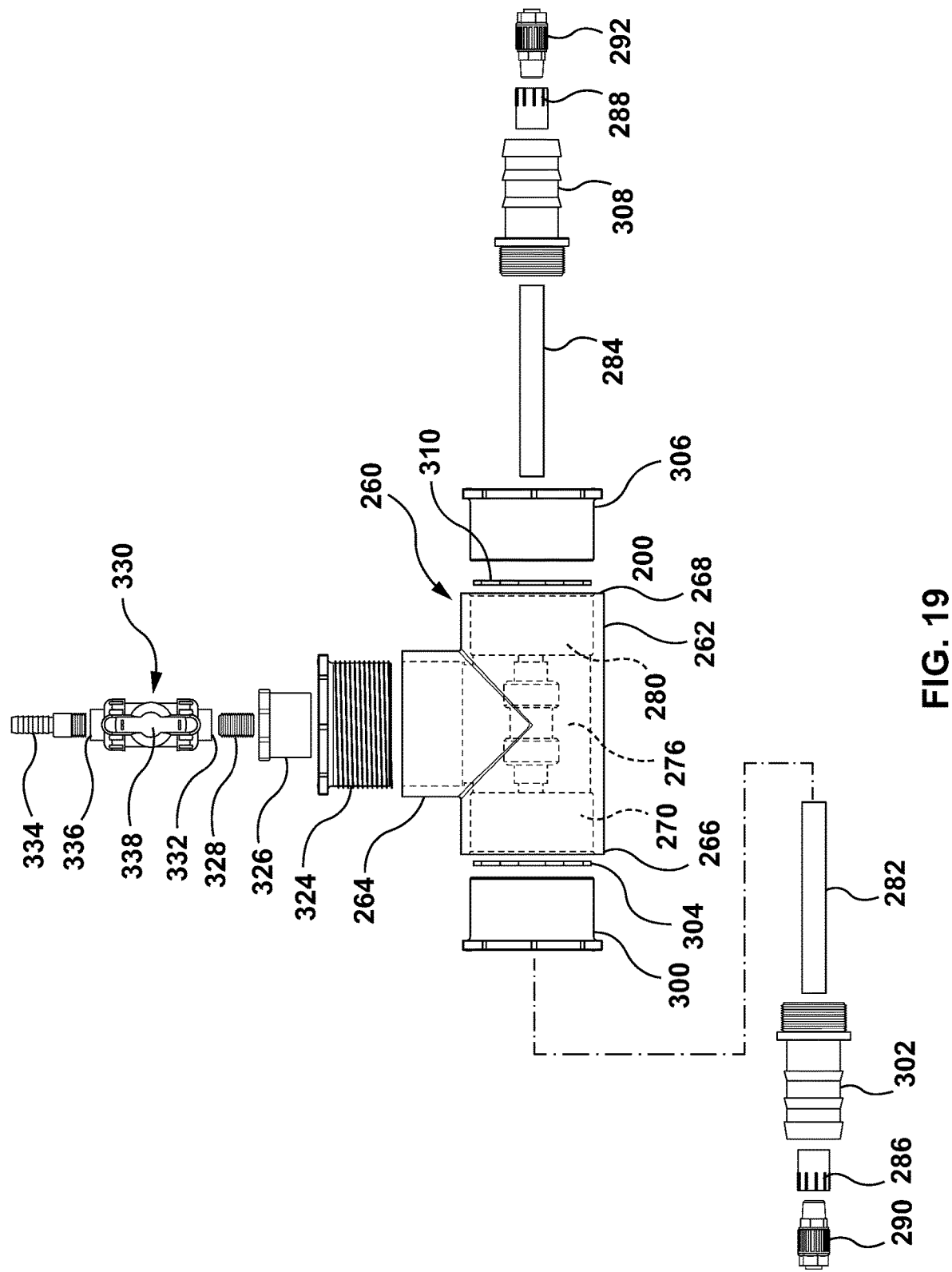
FIG. 19 is an exploded view of the check valve assembly.

Referring now to FIGS. 9-11, the lance assembly 90 will be described in detail. The lance assembly 90 includes an injection lance 120, a first seal 122 disposed between a flange 124 of the process line 20 and a flange 126 of the injection lance 120, a connection flange 128, a second seal 130 disposed between the flange 126 of the injection lance 120 and the connection flange 128, a conduit connector 132 connected to the injection lance 120 and the inner conduit 106 of the first double containment conduit 94, and a hose barb 134 connected to the connection flange 128. Leakage in the lance assembly 90 will be contained by the first and second seals 122 and 130, thereby providing for double containment of the chemical at the lance assembly 90. The first and second seals 122 and 130 may be made of a suitable material, such as ethylene propylene diene monomer (EPDM) rubber, fluorelastomer, etc.

The injection lance 120 includes the flange 126 having a first side 140 that abuts the first seal 122 and a second side 142 that abuts the second seal 130, a stem 144 extending from the first side 140 of the flange 126, and a passage 146 extending through the flange 126 and stem 144. The passage 146 has an inlet 148 at the second side 142 of the flange 126 and a closed inner end 150 proximate the end of the stem 144. One or more outlet ports 152, and as show two outlet ports, are provided in the stem 144 that extend perpendicular to and into the passage 146 above the closed inner end 150 through which the chemical flows from the passage 146 and into the process line 20. The conduit connector 132 is configured to be inserted into the passage 146 at the inlet 148 and coupled to the injection lance 120, for example by a threaded connection. As shown in FIG. 11 with the first seal 122 moved, the injection lance 120 also includes a plurality of circumferentially spaced openings 154 extending therethrough for receiving fasteners to couple the injection lance 120 to the process line 20. The injection lance may be made of a suitable material, such as polyethylene, such as high-density polyethylene (HDPE). The length of the injection lance may be adjusted according to installation location.

The connection flange 128 has a first side 160 that abuts the second seal 130, a second side 162, and a passage 164 extending therethrough. The conduit connector 132 is configured to extend through the passage 164 and the hose barb 134 is configured to be inserted into the passage 160 and coupled to the connection flange 128, for example by a threaded connection. The connection flange 128 includes a plurality of circumferentially spaced openings 166 extending therethrough for receiving fasteners to couple the connection flange to the process line 20.

To assemble the lance assembly 90, the conduit connector 132 is attached to the injection lance 120, the hose barb 134 is attached to the connection flange 128, the first seal 122 is positioned to abut the first side 140 of the flange 126 of the injection lance 120, and the second seal 130 is sandwiched between the first side 160 of the connection flange 128 and the second side 142 of the flange 126 of the injection lance 120. To attach the lance assembly 90 to the process line 20, the stem 144 of the injection lance 120 is inserted through an opening in the flange 124 of the process line 20 and the first seal 122 is sandwiched between the flange 124 of the process line 20 and the first side 140 of the flange 126 of the injection lance 120. The plurality of circumferentially spaced openings 154 are aligned with a corresponding one of the plurality of circumferentially spaced openings 166 such that fasteners are inserted through the openings 154 and 166 into openings in the flange 124 of the process line 20 to couple the lance assembly 90 to the process line 20. It will be appreciated that in an embodiment, the diameter of the flange 126 of the injection lance 120 may be less than the diameter of the connection flange 128 such that the openings 154 are eliminated and the injection lance 120 is sandwiched between the connection flange 128 and the flange 124 of the process line with the fasteners surrounding the perimeter of the flange 126 of the injection lance 120.

The first double containment conduit 94 can then be attached to the lance assembly 90, or alternatively be attached to the lance assembly 90 prior to attachment to the process pipe 20. The inner conduit 106 of the first double containment conduit 94 is attached to the conduit connector 132, and the outer conduit 108 of the first double containment conduit 94 is attached to the hose barb 134. A suitable connector, such as spiral double bolt clamp 170 is attached to the hose barb 134 with the outer conduit 108 sandwiched therebetween. If there is a leak in the inner conduit 106, the clamp 170 and outer conduit 108 can be moved to allow access to the inner conduit 106 to be repaired or to be replaced.

Referring additionally to FIGS. 12-15, the ball valve assembly 92 will be described in detail. The ball valve assembly 92 includes housing 180, such as a T-shaped housing having a horizontal portion 182 and a vertical portion 184 perpendicular to the horizontal portion. The housing may be made of a suitable material, such as PVC, and may be transparent to allow an operator to view the inside of the housing 180 to quickly determine if there are any leaks. Each end of the horizontal portion has an opening 186, 188 and a passage 190 extends between the openings 186 and 188. The vertical portion 184 includes an opening 192 perpendicular to the openings 186 and 188, and a passage 194 perpendicular to the passage 190 and extending from the opening 192 into the passage 190. The ball valve assembly 92 also includes a ball valve 196 disposed in the passage 190, the ball valve 196 having first and second openings 198 and 200 coaxial to one another for connecting first and second conduits 202 and 204 thereto, and a lever 206 for opening and closing the ball valve 196. Attached to the other end of the conduits 202 and 204 are respective threaded connectors 208 and 210 that are threadably connected to respective male connectors 212 and 214. The male connector 212 is connected to the inner conduit 106 of the first double containment conduit 94 and the male connector 214 is connected to the inner conduit 106 of the second double containment conduit 98.

Connected to one end of the horizontal portion 182 of the housing 180 at the opening 186 is a first cap 220, which may be connected in a suitable manner, such as by adhesive. The first cap 220 has one end connected to a hose barb 222 in a suitable manner, such as by a threaded connection, and another end connected to a centralizer 224 in a suitable manner, such as by an adhesive. Similarly, connected to the other end of the horizontal portion 182 of the housing 180 at the opening 188 is a second cap 226, which may be connected in a suitable manner, such as by adhesive. The second cap 226 has one end connected to a hose barb 228 in a suitable manner, such as by a threaded connection, and another end connected to a centralizer 230 in a suitable manner, such as by an adhesive. The centralizers 224 and 230 serve to center the ball valve 196 and conduits 202 and 204 in the horizontal portion 182, and each include a plurality of respective cutouts 232 circumferentially spaced around their perimeters through which leaked fluid received in the hose barbs 222 and 228 can flow into the passage 190.

The hose barbs 222 and 228 are connected to the outer conduit 108 of the respective first and second double containment conduit 94, 98 by a suitable connector, such as a spiral double bolt clamp 236, 238. The hose barbs 222 and 228 each include a passage 240, 242 extending therethrough in which the respective threaded connector 208 and 210 is at least partially disposed. A flow path is defined between the wall of the passage 240, 242 and the respective threaded connector 208, 210 to allow leaked fluid to flow from the outer conduit 108 of the first or second double containment conduit 94 or 98, through the passage 240, 242, and through the cutouts 232.

Connected to the vertical portion 184 of the housing 180 at the opening 192 is a third cap 244, which may be connected in a suitable manner, such as by a threaded connection. Threadably connected to the third cap 244 is an adapter 246, which is threadably connected to a nipple 248. The nipple 248 connects to a first opening 252 of a ball valve 250, and a hose barb 254 connects to a second opening 256 of the ball valve 250. The ball valve 250 includes a lever 258 for opening and closing the ball valve 250 to allow the leaked fluid in the housing 180 to be drained from the system. A suitable conduit can be connected to the hose barb 254 during the draining to direct the fluid being drained to a desired location.

Referring additionally to FIGS. 16-19, the check valve assembly 100 will be described in detail. The check valve assembly 100 includes housing 260, such as a T-shaped housing having a horizontal portion 262 and a vertical portion 264 perpendicular to the horizontal portion. The housing may be made of a suitable material, such as PVC, and may be transparent to allow an operator to view the inside of the housing 260 to quickly determine if there are any leaks. Each end of the horizontal portion 262 has an opening 266, 268 and a passage 270 extends between the openings 266 and 268. The vertical portion 264 includes an opening 272 perpendicular to the openings 266 and 268, and a passage 274 perpendicular to the passage 270 and extending from the opening 272 into the passage 270. The check valve assembly 100 also includes a check valve 276 disposed in the passage 270, the check valve 276 having first and second openings 278 and 280 coaxial to one another for connecting first and second conduits 282 and 284 thereto. Attached to the other end of the conduits 282 and 284 are respective threaded connectors 286 and 288 that are threadably connected to respective male connectors 290 and 292. The male connector 290 is connected to the inner conduit 106 of the third double containment conduit 102 and the male connector 292 is connected to the inner conduit 106 of the fourth double containment conduit 104.

Connected to one end of the horizontal portion 262 of the housing 260 at the opening 266 is a first cap 300, which may be connected in a suitable manner, such as by adhesive. The first cap 300 has one end connected to a hose barb 302 in a suitable manner, such as by a threaded connection, and another end connected to a centralizer 304 in a suitable manner, such as by an adhesive. Similarly, connected to the other end of the horizontal portion 262 of the housing 260 at the opening 268 is a second cap 306, which may be connected in a suitable manner, such as by adhesive. The second cap 306 has one end connected to a hose barb 308 in a suitable manner, such as by a threaded connection, and another end connected to a centralizer 310 in a suitable manner, such as by an adhesive. The centralizers 304 and 410 serve to center the check valve 276 and conduits 282 and 284 in the horizontal portion 262, and each include a plurality of cutouts 312 circumferentially spaced around their perimeters through which leaked fluid received in the hose barbs 302 and 308 can flow into the passage 270.

The hose barbs 302 and 308 are connected to the outer conduit 108 of the respective third and fourth double containment conduit 102, 104 by a suitable connector, such as a spiral double bolt clamp 316, 318. The hose barbs 302 and 308 each include a passage 320, 322 extending therethrough in which the respective threaded connector 286 and 288 is at least partially disposed. A flow path is defined between the wall of the passage 320, 322 and the respective threaded connector 286, 288 to allow leaked fluid to flow from the outer conduit 108 of the third and fourth double containment conduit 102 and 104, through the passage 320, 322, and through the cutouts 312.

Connected to the vertical portion 264 of the housing 260 at the opening 272 is a third cap 324, which may be connected in a suitable manner, such as by a threaded connection. Threadably connected to the third cap 324 is an adapter 326, which is threadably connected to a nipple 328. The nipple 328 connects to a first opening 332 of a ball valve 330, and a hose barb 334 connects to a second opening 336 of the ball valve 330. The ball valve 330 includes a lever 338 for opening and closing the ball valve 330 to allow the leaked fluid in the housing 260 to be drained from the system. A suitable conduit can be connected to the hose barb 334 during the draining to direct the fluid being drained to a desired location.

Figure 20:
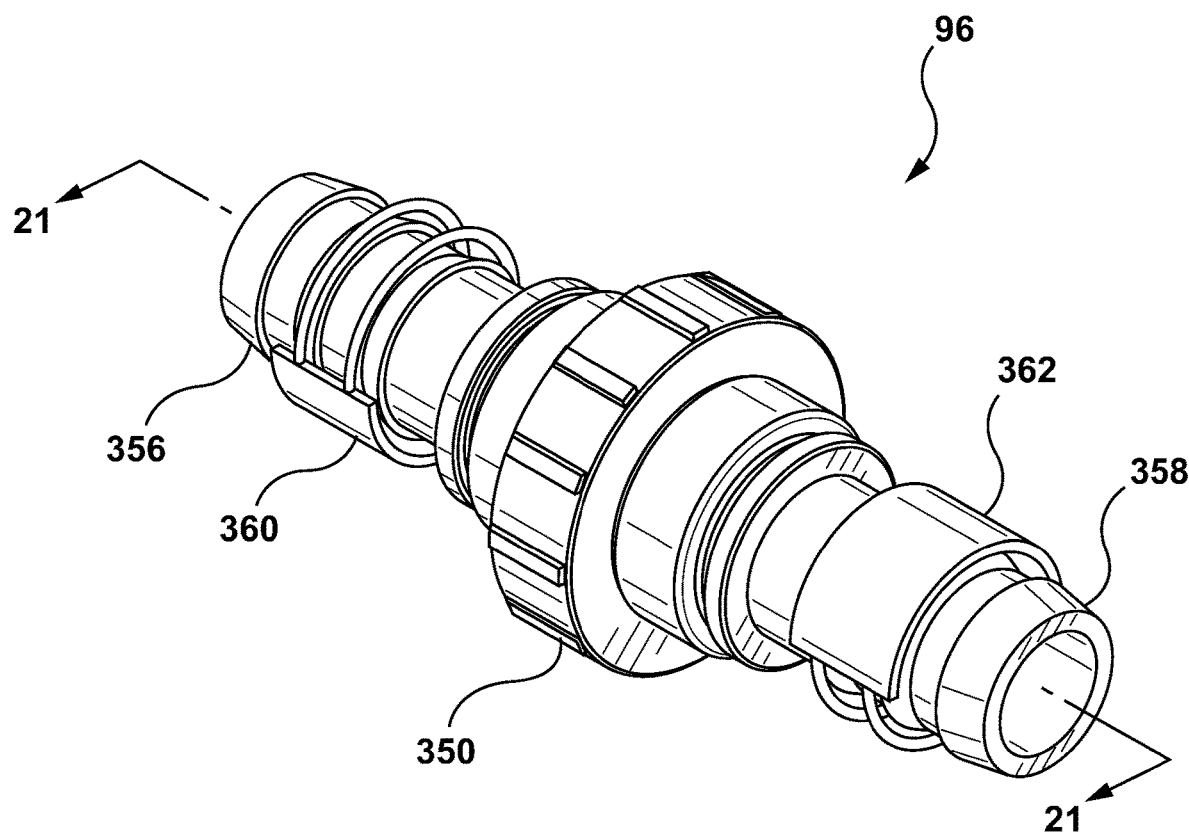
FIG. 20 is a perspective view of a union.
Figure 21:
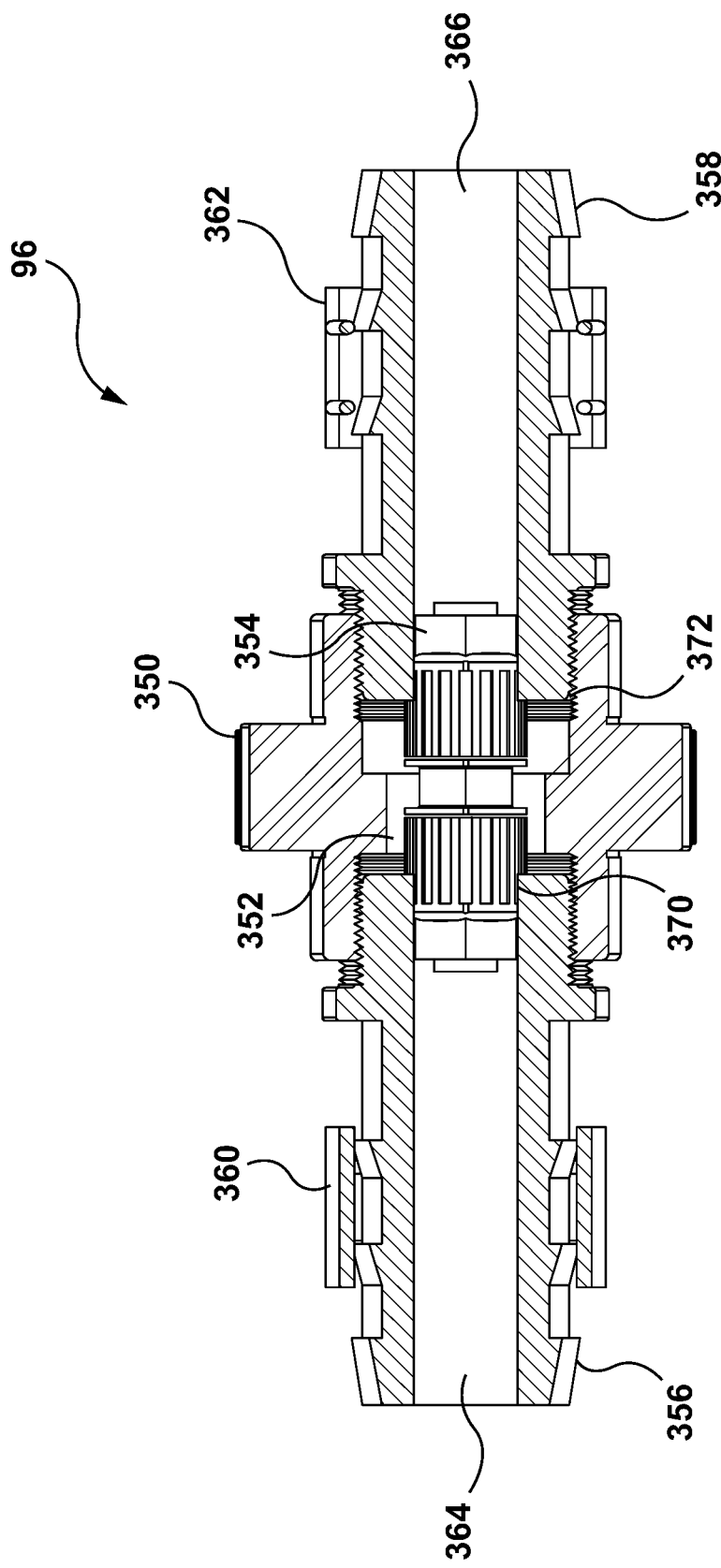
FIG. 21 is a cross-sectional view taken about line 21-21 in FIG. 20.

Referring additionally to FIGS. 20 and 21, the union 96 will be described in detail. The union 96 includes a body 350 having a passage 352 extending therethrough, a union fitting 354 disposed in the passage 352, and first and second hose barbs 356 and 358 connected to the body 350. The hose barbs 356 and 358 are connected to the body 350 in a suitable manner, for example by a threaded connection, and are connected to the outer conduit 108 of the respective second and third double containment conduit 98 and 102 by a suitable connector, such as a spiral double bolt clamp 360, 362. The hose barbs 356 and 358 each include a passage 364, 366 extending therethrough in which a portion of the union fitting 354 is disposed. The union fitting 354 includes a passage extending therethrough and first and second flange portions 370 and 372 that abut respective ends of the first and second hose barbs 356 and 358 when the hose barbs are connected to the body 350 to hold the union fitting 354 in position. The union fitting 354 can be connected to the inner conduit 106 of the second double containment conduit 98 and the inner conduit 106 of the third double containment conduit 102 to connect the inner conduits 106.

Figure 22:
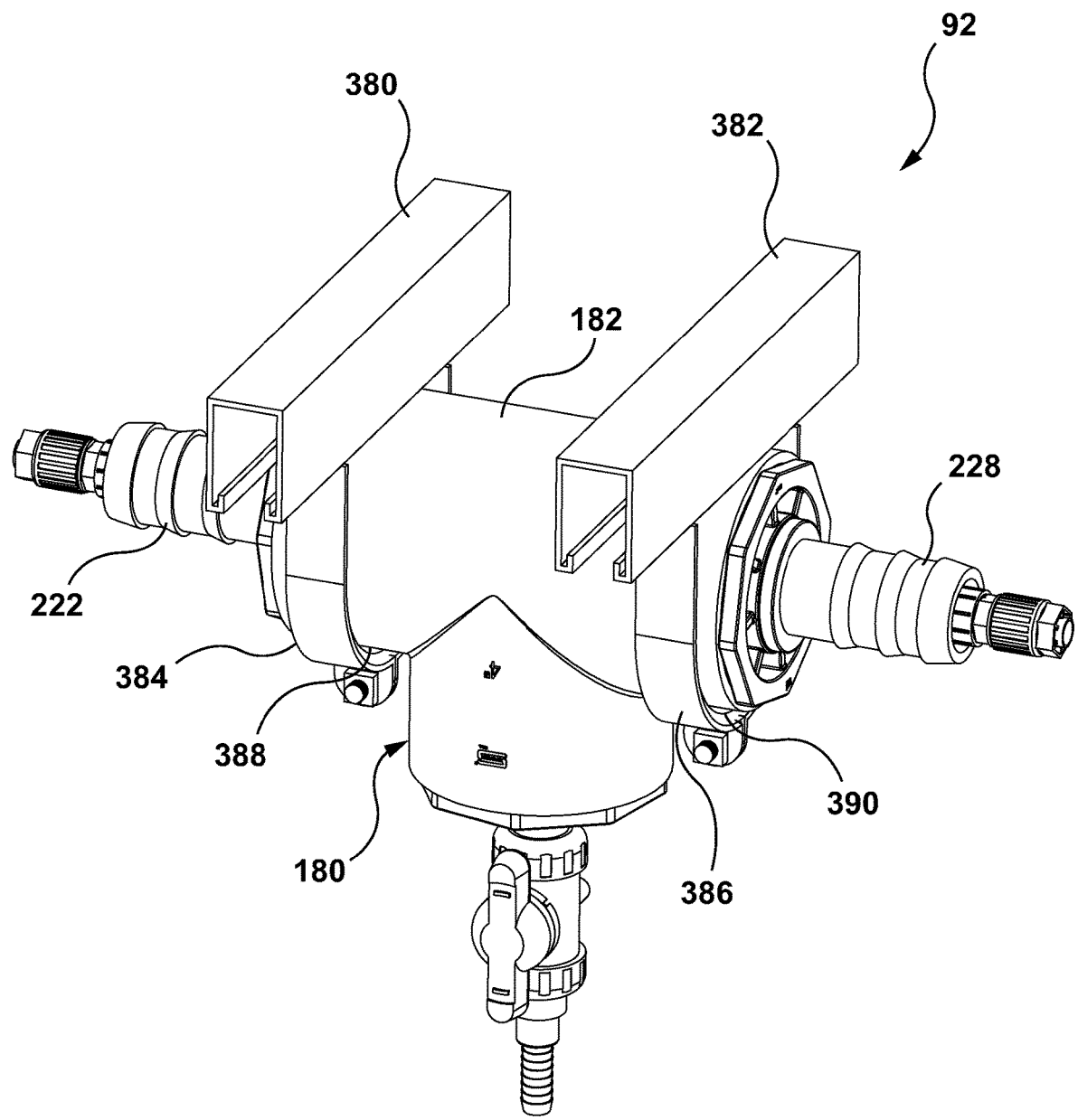
FIG. 22 is another perspective view of the ball valve assembly.

Turning now to FIG. 22, attachment of ball valve assembly 92 to a structure will be described. It will be appreciated that the check valve assembly 100 may be similarly attached to a structure. First and second struts 380 and 382 are provided that can be attached to a structure, such as a wall, ceiling, or other component, in any suitable manner, or alternatively the ball valve assembly 92 can be attached to struts at the install location. Each strut 380, 382 is attached to a respective first and second pipe clamp 384 and 386 that each surround one of the sides of the horizontal portion 182 of the housing 180. A suitable guard 388, 390 is provided between each pipe clamp 384, 386 and the horizontal portion 182.

Figure 23:
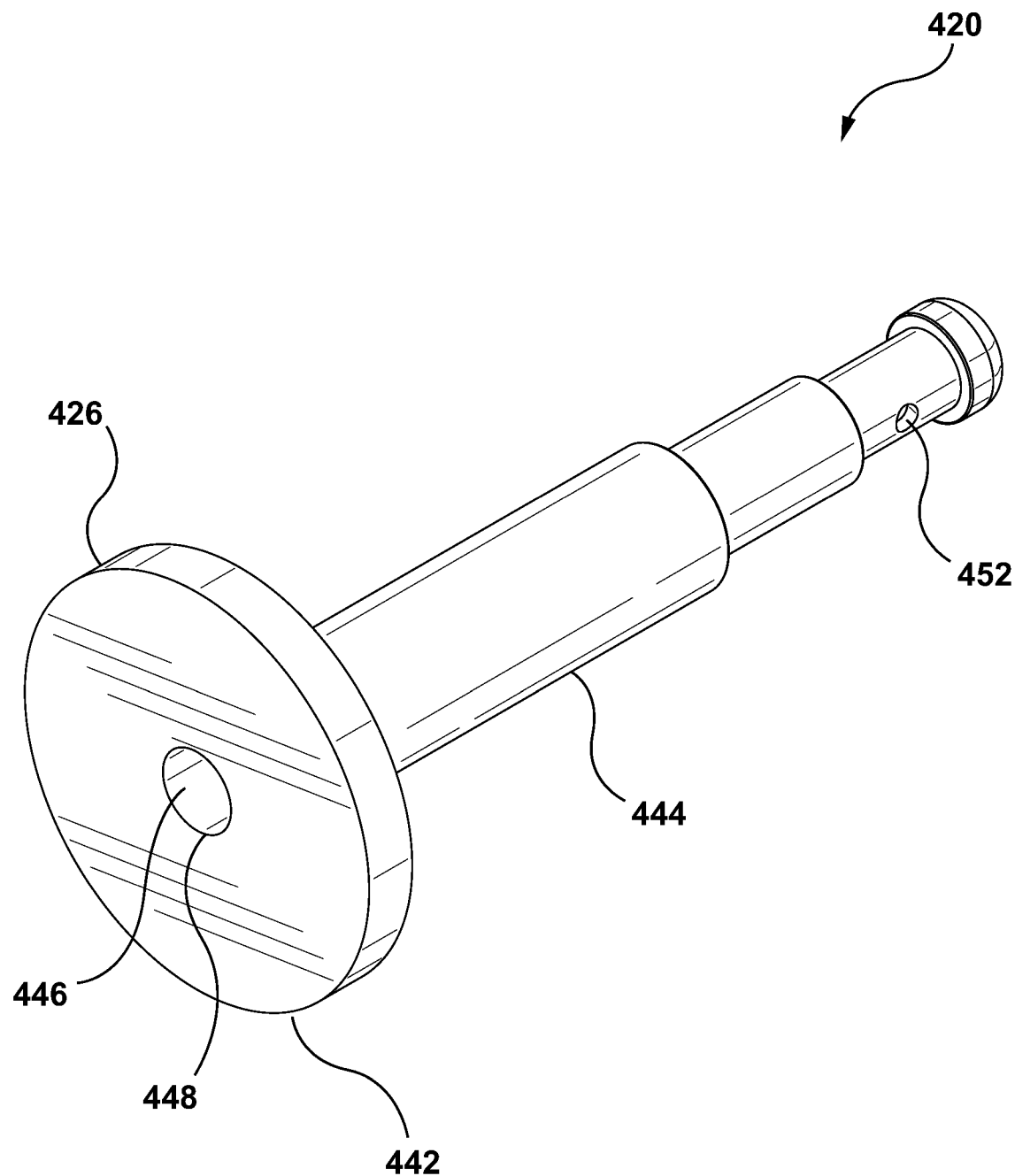
FIG. 23 is a perspective view of a lance.
Figure 24:
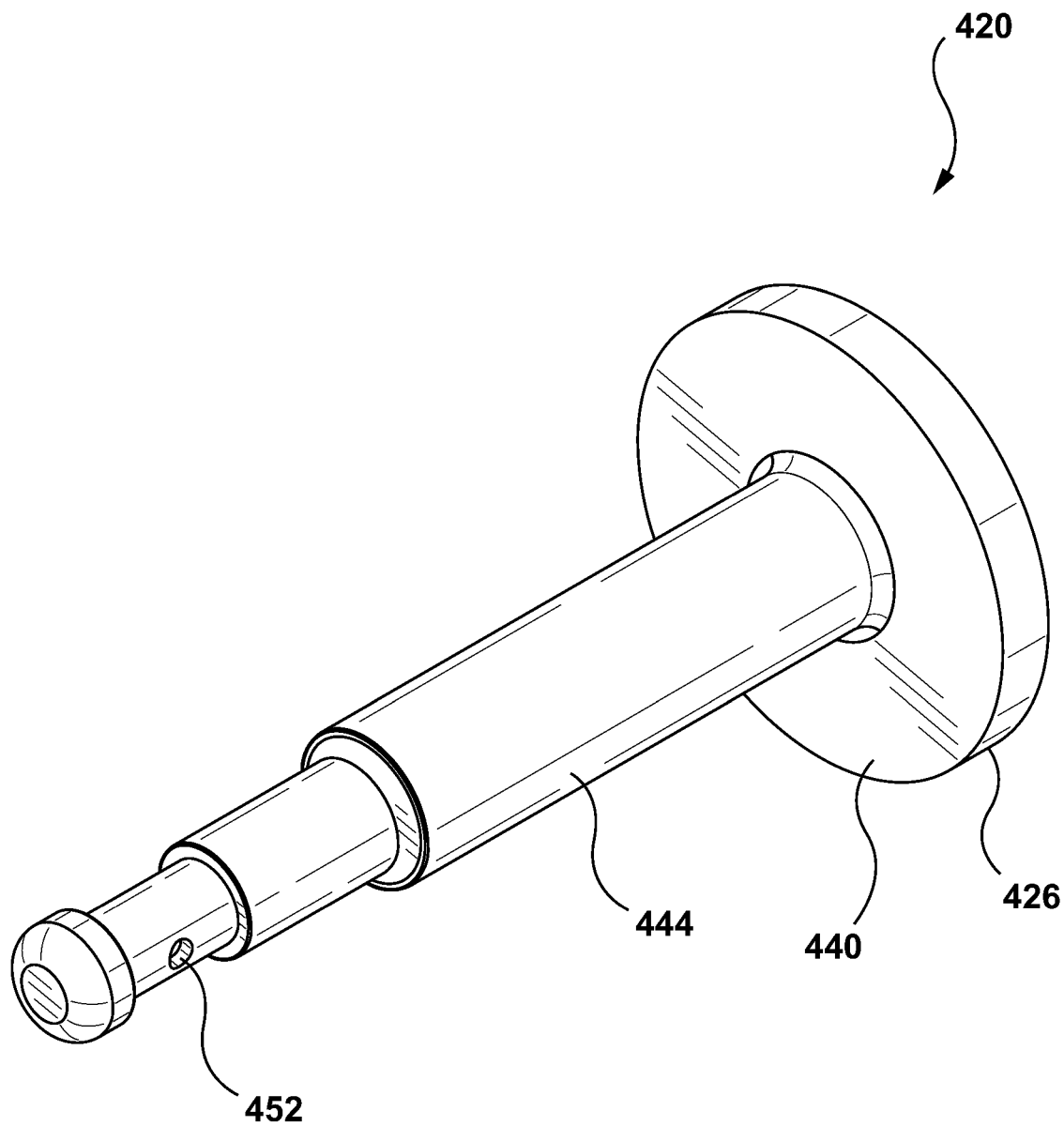
FIG. 24 is another perspective view of the lance.

Turning now to FIGS. 23 and 24, an exemplary embodiment of the lance is shown at 420. The lance 420 is substantially the same as the above-referenced lance 120, and consequently the same reference numerals but indexed by 300 are used to denote structures corresponding to similar structures in the lances. In addition, the foregoing description of the lance 120 is equally applicable to the lance 420 except as noted below.

The injection lance 420 includes a flange 426 having a first side 440 that abuts the first seal 122 and a second side 442 that abuts the second seal 130, a stem 444 extending from the first side 440 of the flange 426, and a passage 446 extending through the flange 426 and stem 444. The passage 446 has an inlet 448 at the second side 442 of the flange 426 and a closed inner end proximate the end of the stem 444. One or more outlet ports 452, and as show two outlet ports, are provided in the stem 444 that extend perpendicular to and into the passage 446 above the closed inner end through which the chemical flows from the passage 446 and into the process line 20. The conduit connector 132 is configured to be inserted into the passage 446 at the inlet 448 and coupled to the injection lance 420, for example by a threaded connection. The injection lance may be made of a suitable material, such as polyethylene, such as high-density polyethylene (HDPE). The diameter of the flange 426 is less than the diameter of the connection flange 128 such that when the injection lance 420 is sandwiched between the connection flange 128 and the flange 124 of the process line 20, the fasteners extending through the openings 166 in the connection flange 128 surround the perimeter of the flange 426 and attach to corresponding openings in the flange 124 of the process line 20 to secure the injection lance 420 in position.

Figure 25:
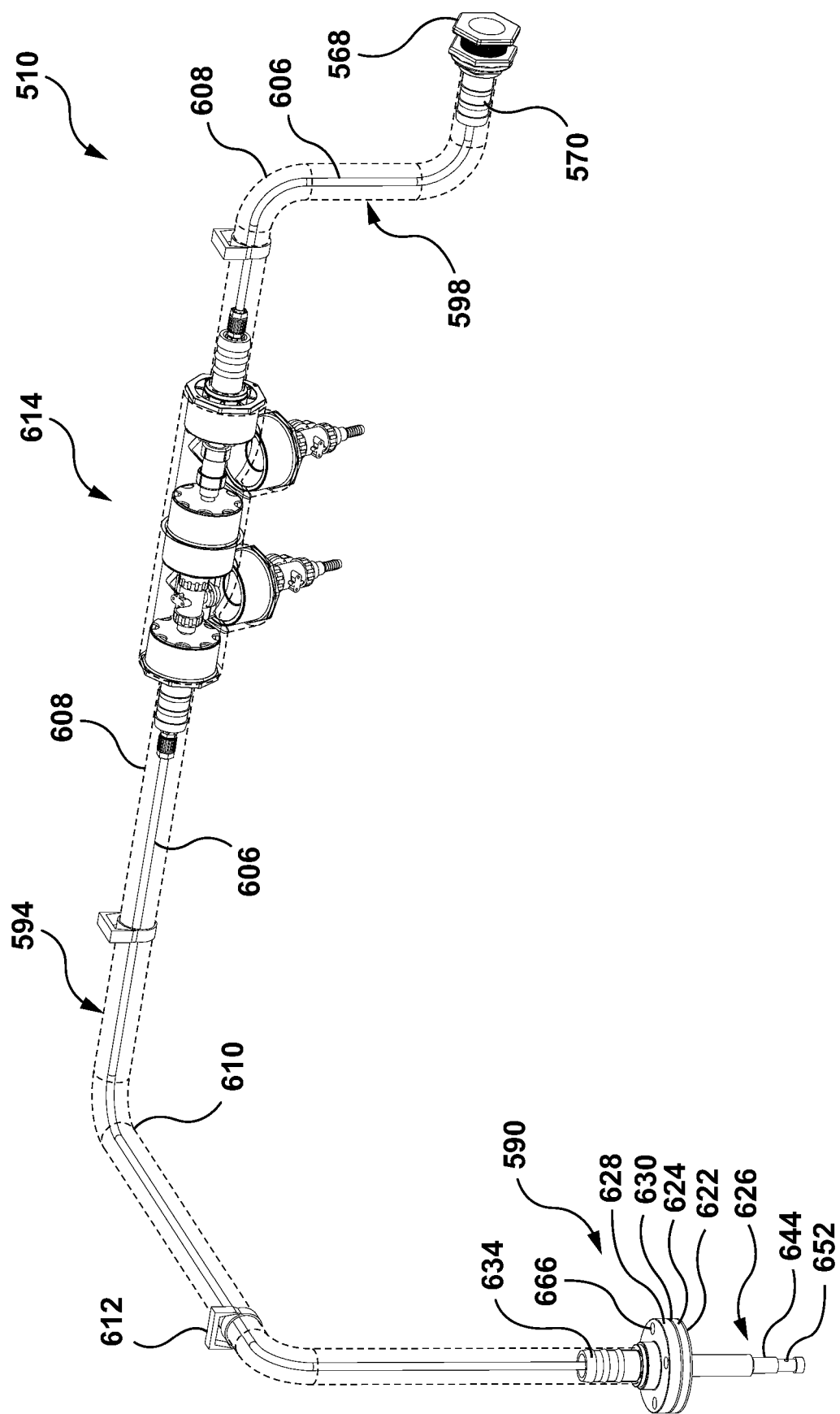
FIG. 25 is a perspective view of another exemplary injection assembly.

Turning now to FIG. 25, an exemplary embodiment of the injection assembly is shown at 518. The injection assembly 518 is substantially the same as the above-referenced injection assembly 18, and consequently the same reference numerals but indexed by 500 are used to denote structures corresponding to similar structures in the injection assemblies. In addition, the foregoing description of the injection assembly 18 is equally applicable to the injection assembly 518 except as noted below.

The injection assembly 518 includes a lance assembly 590, a combination ball valve and check valve assembly 614 connected to the lance assembly 590 by a first double containment conduit 594, and a second double containment conduit 598 connected to a hose barb 570 of a connector 568 attached to a tank. It will be appreciated that depending on the length of the chemical injection system, additional ball valve assemblies, unions, check valve assemblies, double containment conduits, and/or combination ball valve and check valve assemblies may be used, and the lengths of the double containment conduits may be varied.

The first and second double containment conduits 594 and 598 each include an inner conduit 606 through which the chemical flows and an outer conduit 608 that surrounds the respective inner conduit 606 to contain any leakage from the inner conduit 606. The inner and outer conduits 606 and 608 may be flexible, allowing for easy installation and repairs. The inner conduit 606 may be made of a suitable material, such as polyethylene, such as a linear low-density polyethylene, and the outer conduit 608 may be made of a suitable material, such as flexible polyvinyl chloride (PVC) having PVC spirals for rigidity 610. The outer conduit 608 is shown as being transparent to allow an operator to view the inside of the conduit 608 to quickly determine if there are any leaks. The inner conduit 606 of the second double containment conduit 598 is connected to a suitable connector in the hose barb 570 or otherwise extends into the pump box, and a suitable connector, such as spiral double bolt clamp is attached to the hose barb 570 with the outer conduit 608 of the second double containment conduit 598 sandwiched therebetween. One or more clamps 612 may surround the conduits for connection to a structure in a suitable manner.

The lance assembly 590 includes an injection lance 620, a first seal 622 disposed between a flange of the process line and a flange 626 of the injection lance 620, a connection flange 628, a second seal 630 disposed between the flange 626 of the injection lance 620 and the connection flange 628, a conduit connector connected to the injection lance 620 and the inner conduit 606 of the first double containment conduit 594, and a hose barb 634 connected to the connection flange 628.

The injection lance 620 includes the flange 626 having a first side that abuts the first seal 622 and a second side that abuts the second seal 630, a stem 644 extending from the first side of the flange 626, and a passage extending through the flange 626 and stem 644. The passage 646 has an inlet at the second side of the flange 626 and a closed inner end proximate the end of the stem 644. One or more outlet ports 652, and as show two outlet ports, are provided in the stem 644 that extend perpendicular to and into the passage above the closed inner end through which the chemical flows from the passage and into the process line. The conduit connector is configured to be inserted into the passage at the inlet and coupled to the injection lance 620, for example by a threaded connection. The injection lance 620 can include a plurality of circumferentially spaced opening similar to the injection lance 120, or have a smaller diameter than the connection flange 628 similar to the injection lance 420.

The connection flange 628 has a first side that abuts the second seal 130, a second side, and a passage extending therethrough. The conduit connector is configured to extend through the passage in the flange 628 and the hose barb 634 is configured to be inserted into the passage and coupled to the connection flange 628, for example by a threaded connection. The connection flange 628 includes a plurality of circumferentially spaced openings 666 extending therethrough for receiving fasteners to couple the connection flange to the process line similar to any of the embodiments discussed above.

The inner conduit 606 of the first double containment conduit 594 is attached to the conduit connector, and the outer conduit 608 of the first double containment conduit 594 is attached to the hose barb 634. A suitable connector, such as spiral double bolt clamp is attached to the hose barb 634 with the outer conduit 608 sandwiched therebetween. If there is a leak in the inner conduit 606, the clamp 670 and outer conduit 608 can be moved to allow access to the inner conduit 606 to be repaired or to be replaced.

Figure 26:
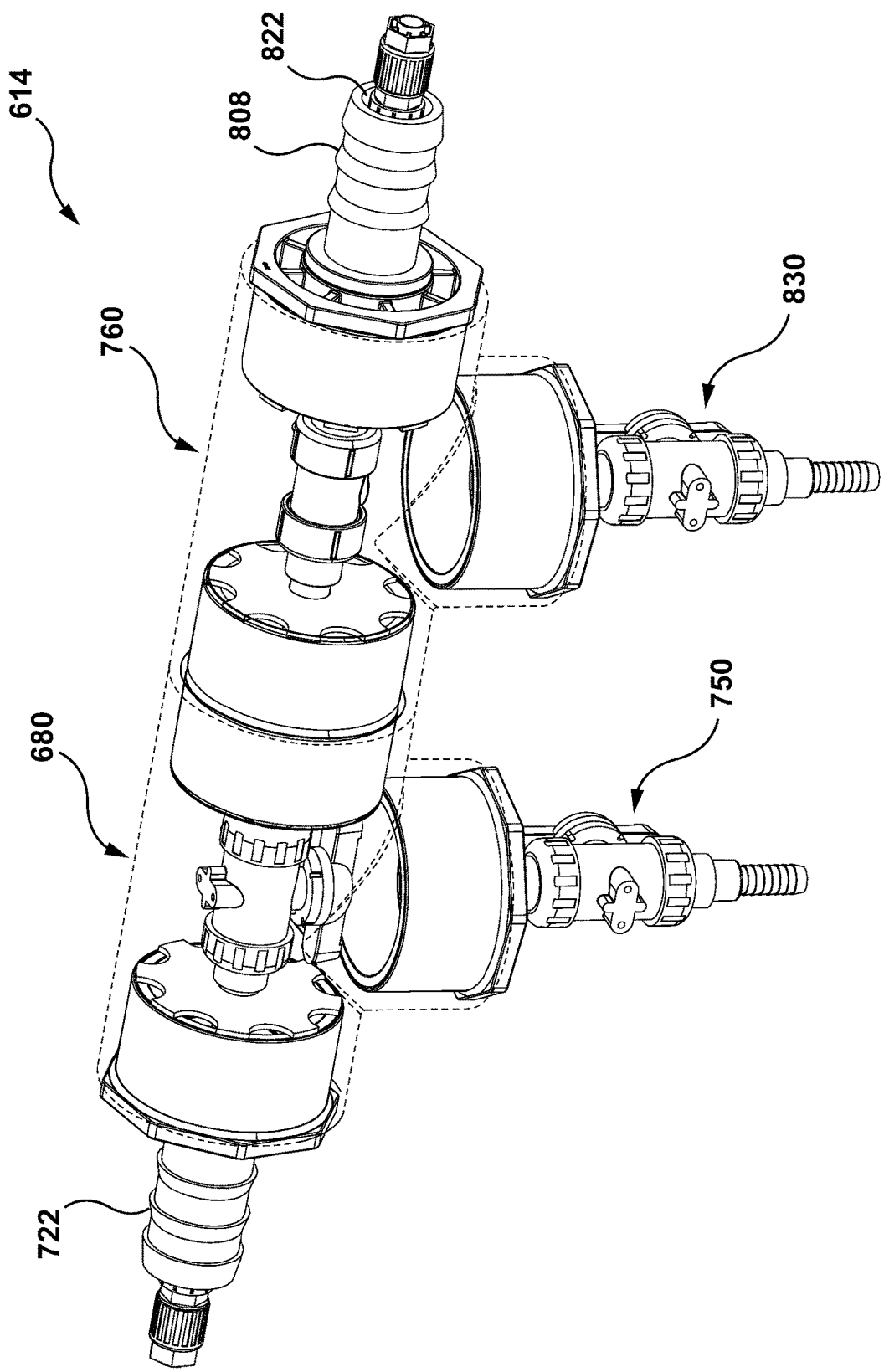
FIG. 26 is a perspective view of an exemplary combination ball valve and check valve assembly.
Figure 27:
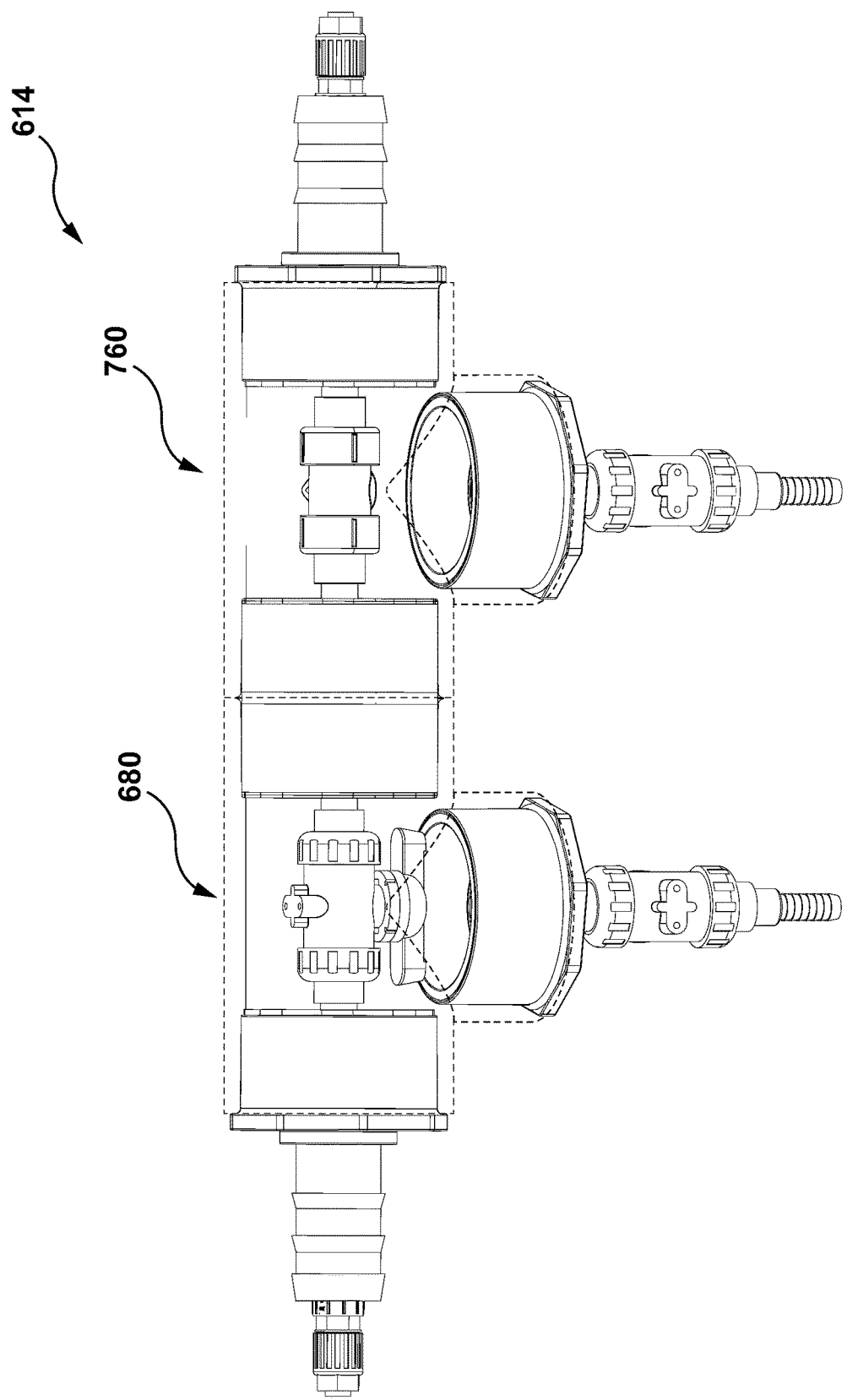
FIG. 27 is front view of the combination ball valve and check valve assembly.
Figure 28:
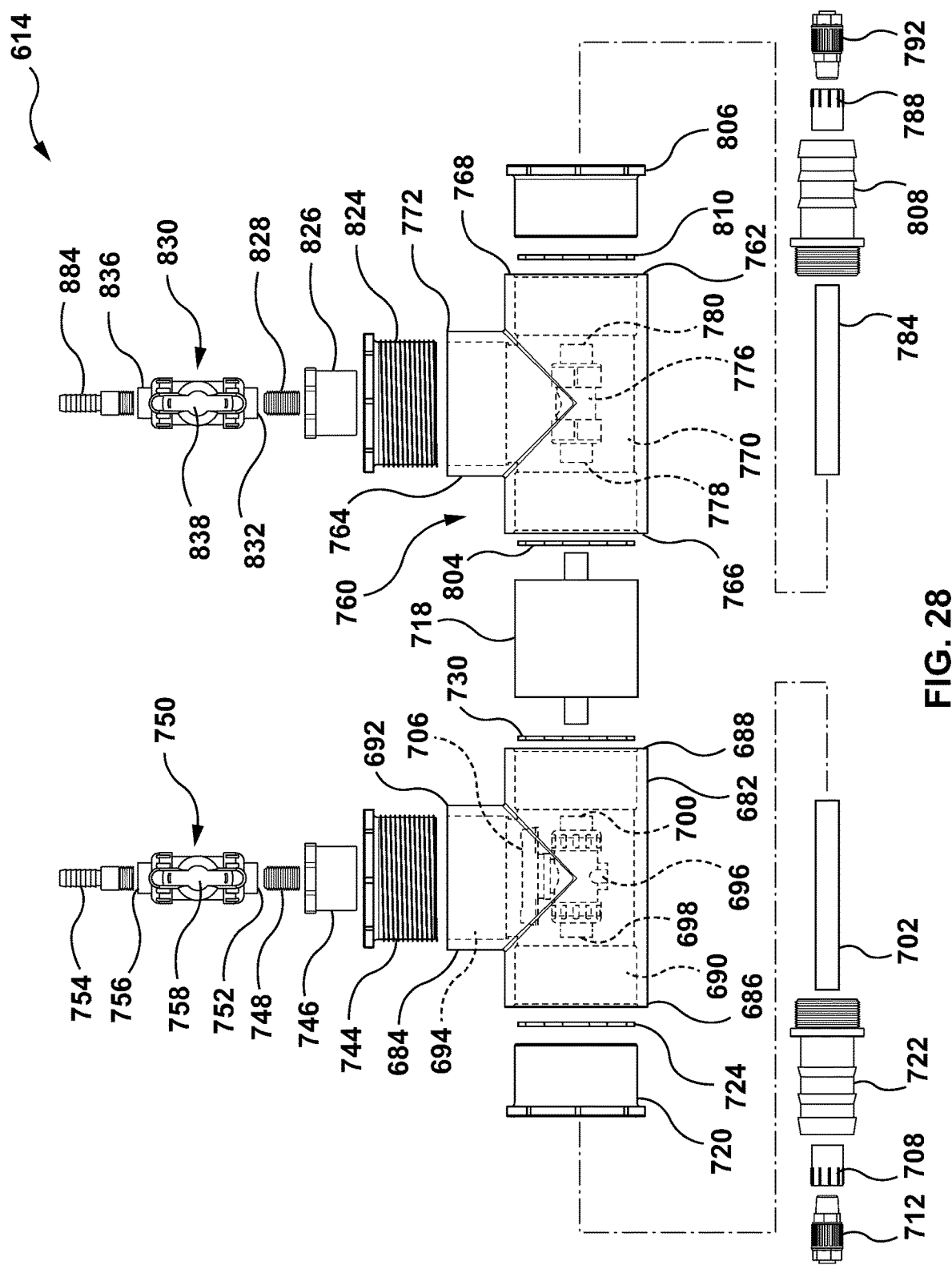
FIG. 28 is an exploded view of the combination ball valve and check valve assembly.

Referring additionally to FIGS. 26-28, the combination ball valve and check valve assembly 614 will be described in detail. The assembly 614 includes a ball valve housing 680, such as a T-shaped housing having a horizontal portion 682 and a vertical portion 684 perpendicular to the horizontal portion. The housing 680 may be made of a suitable material, such as PVC, and may be transparent to allow an operator to view the inside of the housing 680 to quickly determine if there are any leaks. Each end of the horizontal portion has an opening 686, 688 and a passage 690 extends between the openings 686 and 688. The vertical portion 684 includes an opening 692 perpendicular to the openings 686 and 688, and a passage 694 perpendicular to the passage 690 and extending from the opening 692 into the passage 690. The assembly 592 also includes a ball valve 696 disposed in the passage 690, the ball valve 696 having first and second openings 698 and 700 coaxial to one another for connecting to a first conduit 702 and an end of a conduit 716 of connection 718, and a lever 706 for opening and closing the ball valve 696. Attached to the other end of the conduit 702 is a threaded connector 708 that is threadably connected to a male connector 712. The male connector 712 is connected to the inner conduit 606 of the first double containment conduit 594.

Connected to one end of the horizontal portion 682 of the housing 680 at the opening 686 is a first cap 720, which may be connected in a suitable manner, such as by adhesive. The first cap 720 has one end connected to a hose barb 722 in a suitable manner, such as by a threaded connection, and another end connected to a centralizer 724 in a suitable manner, such as by an adhesive. Connected to the other end of the horizontal portion 682 of the housing 680 at the opening 688 is the connection 718, which may be connected in a suitable manner, such as by adhesive. The connection 718 has an end connected to a centralizer 730 in a suitable manner, such as by an adhesive. The centralizers 724 and 730 serve to center the ball valve 696 and conduits 702 and 716 in the horizontal portion 682, and each include a plurality of respective cutouts 732 circumferentially spaced around their perimeters through which leaked fluid can flow into the passage 690.

The hose barb 722 is connected to the outer conduit 608 of the first double containment conduit 594 by a suitable connector, such as a spiral double bolt clamp. The hose barb 722 includes a passage 740 extending therethrough in which the threaded connector 708 is at least partially disposed. A flow path is defined between the wall of the passage 740 and the threaded connector 708 to allow leaked fluid to flow from the outer conduit 608 of the first double containment conduit 594, through the passage 740, and through the cutouts 732.

Connected to the vertical portion 684 of the housing 680 at the opening 692 is a cap 744, which may be connected in a suitable manner, such as by a threaded connection. Threadably connected to the cap 744 is an adapter 746, which is threadably connected to a nipple 748. The nipple 748 connects to a first opening 752 of a ball valve 750, and a hose barb 754 connects to a second opening 756 of the ball valve 750. The ball valve 750 includes a lever 758 for opening and closing the ball valve 750 to allow the leaked fluid in the housing 680 to be drained from the system. A suitable conduit can be connected to the hose barb 754 during the draining to direct the fluid being drained to a desired location.

The check valve assembly 614 also includes a check valve housing 760, such as a T-shaped housing having a horizontal portion 762 and a vertical portion 764 perpendicular to the horizontal portion. The housing may be made of a suitable material, such as PVC, and may be transparent to allow an operator to view the inside of the housing 760 to quickly determine if there are any leaks. Each end of the horizontal portion 762 has an opening 766, 768 and a passage 770 extends between the openings 766 and 768. The vertical portion 764 includes an opening 772 perpendicular to the openings 766 and 768, and a passage 774 perpendicular to the passage 770 and extending from the opening 772 into the passage 770. The assembly 614 also includes a check valve 776 disposed in the passage 770, the check valve 776 having first and second openings 778 and 780 coaxial to one another for connecting to the other end of the conduit 716 of connection 718 and to a second conduit 784. Attached to the other end of the conduit 784 is a threaded connector 788 that is threadably connected to a male connector 792. The male connector 792 is connected to the inner conduit 606 of the second double containment conduit 598.

Connected to one end of the horizontal portion 762 of the housing 760 at the opening 766 is the connection 718, which may be connected in a suitable manner, such as by adhesive.

The connection 718 has an end connected to a centralizer 804 in a suitable manner, such as by an adhesive. Connected to the other end of the horizontal portion 762 of the housing 760 at the opening 768 is a second cap 806, which may be connected in a suitable manner, such as by adhesive. The second cap 806 has one end connected to a hose barb 808 in a suitable manner, such as by a threaded connection, and another end connected to a centralizer 810 in a suitable manner, such as by an adhesive. The centralizers 804 and 810 serve to center the check valve 876 and conduits 784 and 716 in the horizontal portion 762, and each include a plurality of cutouts 812 circumferentially spaced around their perimeters through which leaked fluid can flow into the passage 770.

The hose barb 808 is connected to the outer conduit 608 of the second double containment conduit 598 by a suitable connector, such as a spiral double bolt clamp. The hose barb 808 includes a passage 822 extending therethrough in which the threaded connector 788 is at least partially disposed. A flow path is defined between the wall of the passage 822 and the threaded connector 788 to allow leaked fluid to flow from the outer conduit 608 of the second double containment conduit 598, through the passage 822, and through the cutouts 812.

Connected to the vertical portion 764 of the housing 760 at the opening 772 is a cap 824, which may be connected in a suitable manner, such as by a threaded connection. Threadably connected to the cap 824 is an adapter 826, which is threadably connected to a nipple 828. The nipple 828 connects to a first opening 832 of a ball valve 830, and a hose barb 834 connects to a second opening 836 of the ball valve 830. The ball valve 830 includes a lever 838 for opening and closing the ball valve 830 to allow the leaked fluid in the housing 760 to be drained from the system. A suitable conduit can be connected to the hose barb 834 during the draining to direct the fluid being drained to a desired location.

Figure 29:
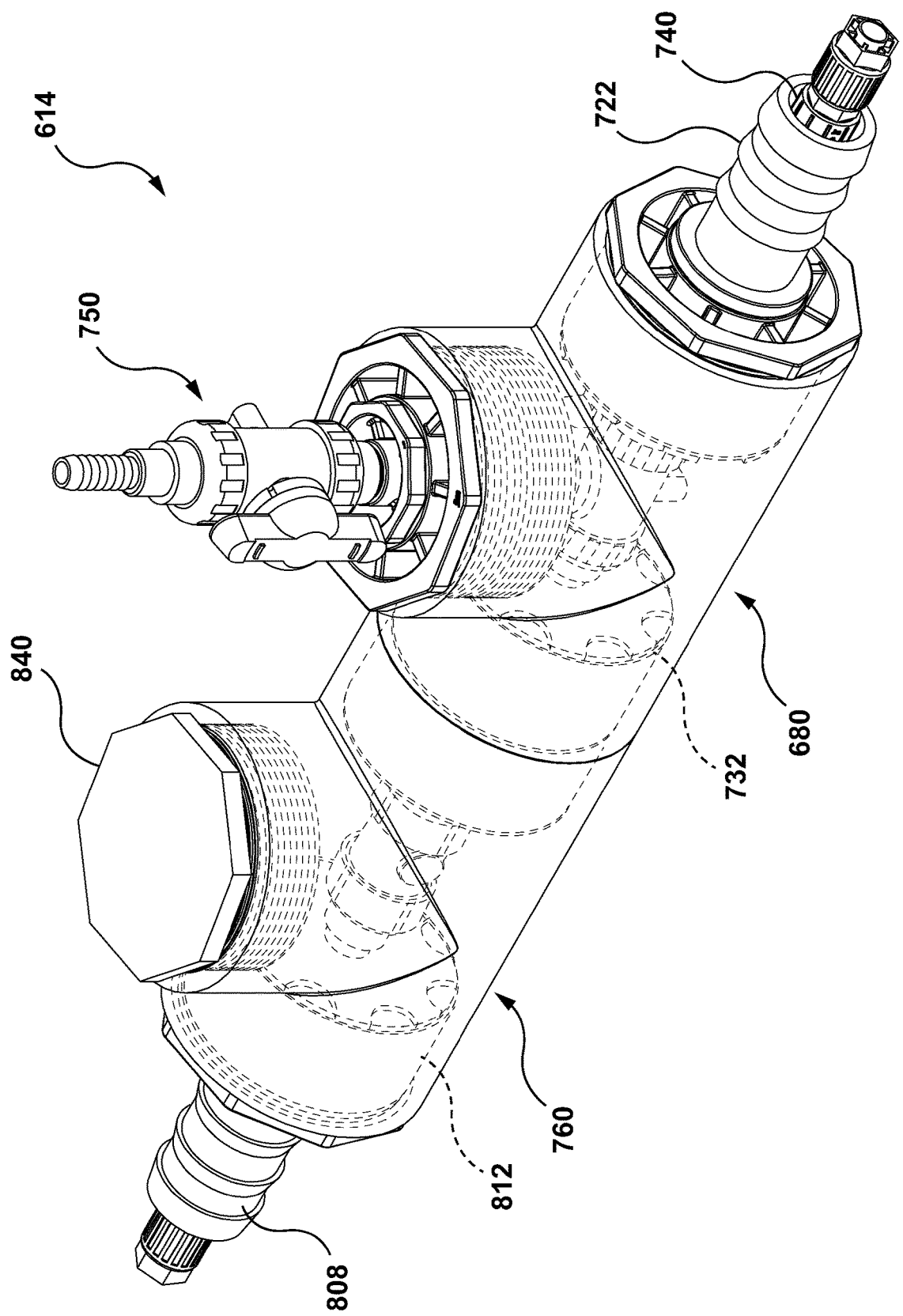
FIG. 29 is a perspective view of another combination ball valve and check valve assembly.
Figure 30:
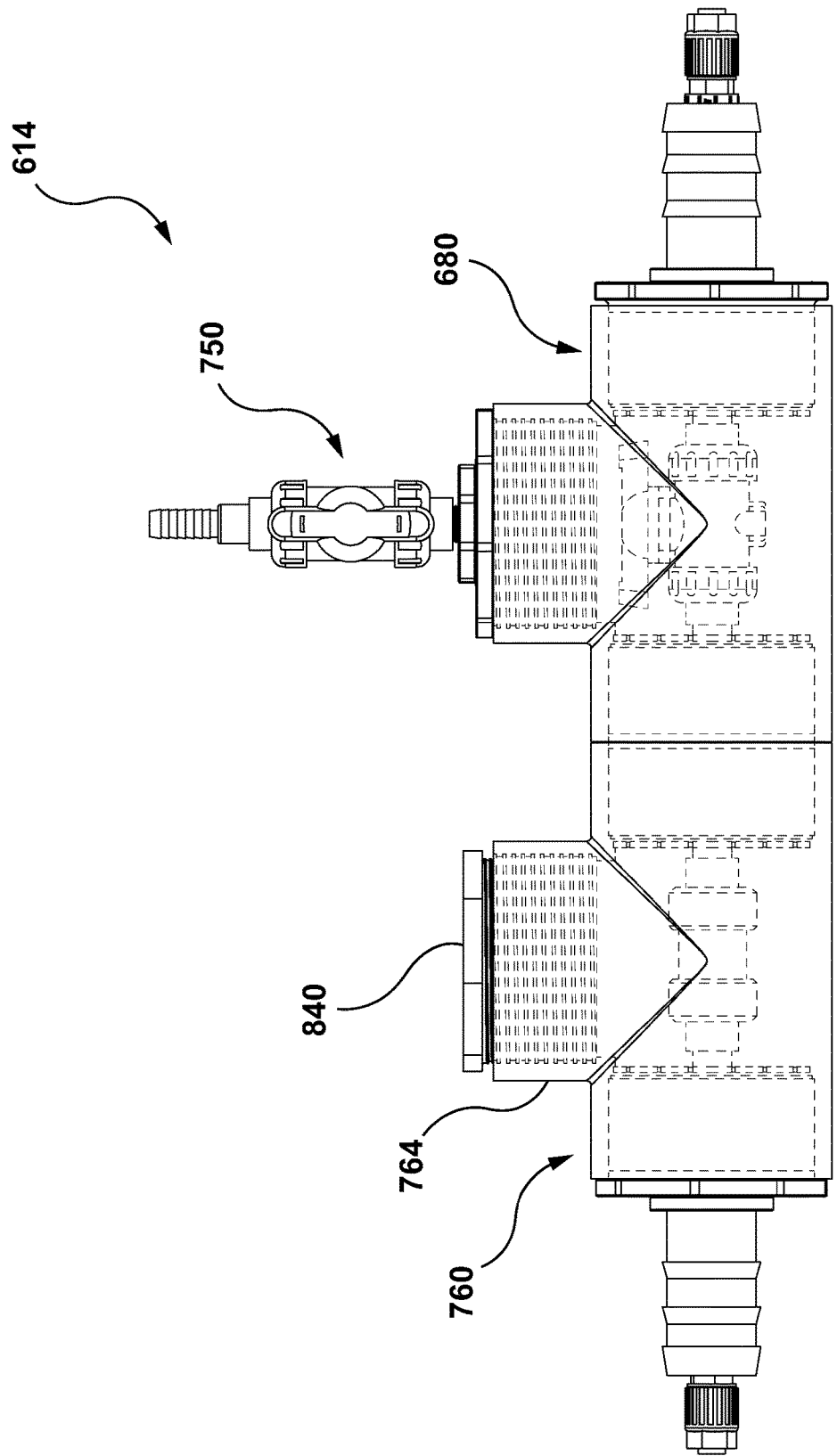
FIG. 30 is a front view of the combination ball valve and check valve assembly.

Turning now to FIGS. 29 and 30, the combination ball valve and check valve assembly 614 is shown with a cap 840 connected to the vertical portion 764 of the housing 760 at the opening 772 in a suitable manner, such as by a threaded connection. The cap seals off the opening 772 to prevent fluid flow therethrough.

The aforementioned systems, components, (e.g., lance, pump box, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the apparatus, systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A chemical injection system for connection to a chemical tank and a process line, the chemical injection system comprising:
   a pump box configured to attach to the chemical tank, the pump box including a body defining an interior;
   a pump assembly disposed within the interior of the body of the pump box; and
   an injection assembly configured to be fluidly coupled to the pump box, the injection assembly including:
   an injection lance having a flange with first and second sides, a stem extending from the first side of the flange and configured to be received in the process line, a passage extending through the flange and stem, and one or more outlet ports in the stem extending perpendicular to and into the passage, the passage having an inlet at the second side of the flange for receiving a chemical;
   a first seal abutting the first side of the flange of the injection lance and configured to abut a flange of the process line; and
   a second seal abutting the second side of the flange of the injection lance.

2. The chemical injection system according to claim 1, wherein the injection assembly further includes a connection flange having a first side abutting the second seal and a second side, and a hose barb connected to the connection flange at the second side.

3. The chemical injection system according to claim 2, wherein the flange of the injection lance has a first diameter, and wherein the connection flange has a second diameter greater than the first diameter.

4. The chemical injection system according to claim 3, wherein the connection flange includes a plurality of openings extending therethrough for receiving fasteners to attach the connection flange to the flange of the process line, and wherein the openings are radially outwardly spaced from a perimeter of the injection lance when the connection flange and injection lance are assembled.

5. The chemical injection system according to claim 2, wherein the injection assembly further includes one or more double containment conduits connected between the pump box and the injection lance, the one or more double containment conduits having an inner conduit through which the chemical is configured to flow from the pump assembly to the injection lance, and an outer conduit surrounding the inner conduit and configured to be connected to the hose barb.

6. The chemical injection system according to claim 5, wherein the injection assembly further includes a conduit connector connected to the injection lance and the inner conduit.

7. The chemical injection system according to claim 5, wherein the injection assembly further includes a ball valve assembly having a housing and a ball valve disposed within the housing, wherein the ball valve is fluidly connected between the pump box and the injection lance and is configured to be closed to allow for maintenance to the injection assembly.

8. The chemical injection system according to claim 7, wherein the injection assembly further includes a check valve assembly having a housing and a check valve disposed within the housing, wherein the check valve is fluidly connected between the pump box and the ball valve assembly and is configured to prevent back flow of fluid to the pump box through the inner conduit.

9. The chemical injection system according to claim 5, wherein the injection assembly further includes a combination ball valve and check valve assembly having a housing, a ball valve disposed in the housing, and a check valve disposed in the housing, wherein the combination ball valve and check valve are fluidly connected between the pump box and the injection lance.

10. The chemical injection system according to claim 1, wherein the pump box additionally includes an access door pivotally coupled to the body and first or second legs coupled to the body and configured to be coupled to the chemical tank.

11. The chemical injection system according to claim 1, wherein the pump box includes a drain port at a bottom of the body and a drain conduit connected to the drain port for delivering leaked chemical into the chemical tank.

12. The chemical injection system according to claim 11, wherein the pump box additionally includes a suction port on a side of the body coupled to a double containment conduit configured to connect to a suction lance in the chemical tank.

13. The chemical injection system according to claim 12, wherein the pump box additionally includes a discharge port on a side of the body configured to fluidly couple to the injection assembly via a double containment conduit.

14. A lance assembly comprising:
an injection lance having a flange with first and second sides, a stem extending from the first side of the flange, a passage extending through the flange and stem, and one or more outlet ports in the stem extending perpendicular to and into the passage, the passage having an inlet at the second side of the flange and a closed inner end;
a first seal abutting the first side of the flange of the injection lance and configured to abut a flange of a process line;
a second seal abutting the second side of the flange of the injection lance;
a connection flange having a first side abutting the second seal and a second side; and
a hose barb connected to the connection flange at the second side.

15. The lance assembly according to claim 14, wherein the flange of the injection lance has a first diameter, and wherein the connection flange has a second diameter greater than the first diameter.

16. The lance assembly according to claim 15, wherein the connection flange includes a plurality of openings extending therethrough for receiving fasteners to attach the connection flange to a flange of the process line, and wherein the openings are radially outwardly spaced from a perimeter of the injection lance when the connection flange and injection lance are assembled.

17. The lance assembly according to claim 14, further including a double containment conduit having an inner conduit fluidly connected to the injection lance to deliver chemical to the lance and an outer conduit surrounding the inner conduit and being connected to the hose barb.

18. A chemical injection system for connection to a chemical tank and a process line, the chemical injection system comprising:
a pump box configured to attach to the chemical tank, the pump box including a body defining an interior;
a pump assembly disposed within the interior of the body of the pump box; and
an injection assembly configured to be fluidly coupled to the pump box, the injection assembly including:
an injection lance having a flange with first and second sides, a stem extending from the first side of the flange and configured to be received in the process line, a passage extending through the flange and stem, and one or more outlet ports in the stem extending perpendicular to and into the passage, the passage having an inlet at the second side of the flange for receiving a chemical;
a first seal abutting the first side of the flange of the injection lance and configured to abut a flange of the process line;
a second seal abutting the second side of the flange of the injection lance;
a connection flange having a first side abutting the second seal and a second side;
a hose barb connected to the connection flange at the second side; and
one or more double containment conduits connected between the pump box and the injection lance, the one or more double containment conduits having an inner conduit fluidly connected to the injection lance for delivering the chemical from the pump assembly to the injection lance, and an outer conduit surrounding the inner conduit and being connected to the hose barb.

19. The chemical injection system according to claim 18, wherein the injection assembly further includes a combination ball valve and check valve assembly having a housing, a ball valve disposed in the housing, and a check valve disposed in the housing, wherein the combination ball valve and check valve are fluidly connected between the pump box and the injection lance.

20. The chemical injection system according to claim 19, wherein the one or more double containment conduits includes a first and second double containment conduit, wherein the first double containment conduit is connected between the injection lance and the combination ball valve and check valve assembly, and the second double containment conduit is connected between the combination ball valve and check valve assembly and the pump box.

* * * * *